US012598531B2

(12) United States Patent
Shaw et al.

(10) Patent No.: US 12,598,531 B2
(45) Date of Patent: Apr. 7, 2026

(54) METHOD AND APPARATUS FOR COORDINATING WIRELESS RESOURCES IN A COMMUNICATION NETWORK

(71) Applicant: AT&T Intellectual Property I, L.P., Atlanta, GA (US)

(72) Inventors: Venson Shaw, Kirkland, WA (US); Sangar Dowlatkhah, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 693 days.

(21) Appl. No.: 17/536,367

(22) Filed: Nov. 29, 2021

(65) Prior Publication Data

US 2022/0086729 A1      Mar. 17, 2022

Related U.S. Application Data

(63) Continuation of application No. 16/356,787, filed on Mar. 18, 2019, now Pat. No. 11,218,941, which is a
(Continued)

(51) Int. Cl.
*H04W 36/36*      (2009.01)
*H04W 36/08*      (2009.01)
(Continued)

(52) U.S. Cl.
CPC ........... *H04W 36/36* (2013.01); *H04W 36/08* (2013.01); *H04W 36/1443* (2023.05); *H04W 36/30* (2013.01); *H04W 36/324* (2023.05)

(58) Field of Classification Search
CPC ..... H04W 72/56; H04W 48/18; H04W 72/04; H04W 28/02; H04W 36/08;
(Continued)

(56) References Cited

U.S. PATENT DOCUMENTS 6,112,081 A      8/2000  Namura et al.
7,027,801 B1    4/2006  Hall et al.
(Continued)

FOREIGN PATENT DOCUMENTS

CN      102421104 A      4/2012
CN      103139877 A      6/2013
(Continued)

OTHER PUBLICATIONS

Azuaje, Consuelo, "ZTE and Intel Collaborate to Produce World's First SDN/NFV 5G RAN Solution", http://www.jbrehm.com/blog/2017/3/9/zte-and-intel-collaborate-to-produce-worlds-first-sdnnfv-5g-ran-solution, Mar. 9, 2017, pp. 1-3.
(Continued)

*Primary Examiner* — Nam T Huynh
(74) *Attorney, Agent, or Firm* — Guntin & Gust, PLC; Kenneth S. Kwan

(57)      ABSTRACT

Aspects of the subject disclosure may include, for example, a method including determining according to first information associated with a first wireless access network and second information associated with a second wireless access network, whether to facilitate communication in a geographic area between a first wireless communication device and a communication network via the second wireless access network, and, in turn, directing a second wireless access device of the second wireless access network to facilitate the communication between the first wireless communication device and the communication network, and directing a first wireless access device of the first wireless access network to stop facilitating second communication between the first wireless communication device and the communication network. Other embodiments are disclosed.

20 Claims, 6 Drawing Sheets

200

Related U.S. Application Data continuation of application No. 15/652,127, filed on Jul. 17, 2017, now Pat. No. 10,278,108.

(51) Int. Cl.

| | |
|---|---|
| *H04W 36/14* | (2009.01) |
| *H04W 36/30* | (2009.01) |
| *H04W 36/32* | (2009.01) |

(58) Field of Classification Search

CPC ... H04W 72/543; H04W 48/16; H04W 88/06; H04W 48/04; H04W 36/302; H04W 24/10; H04W 36/0085; H04W 36/22; H04W 36/14

See application file for complete search history.

(56) References Cited

U.S. PATENT DOCUMENTS

| | | | |
|---|---|---|---|
| 7,257,404 | B1 | 8/2007 | Chow et al. |
| 8,526,931 | B1 | 9/2013 | Fraley et al. |
| 9,031,606 | B2 | 5/2015 | Daniel |
| 9,338,723 | B2 | 5/2016 | Aguirre |
| 9,374,289 | B2 | 6/2016 | Chang et al. |
| 9,467,910 | B2 | 10/2016 | Laganier |
| 9,532,220 | B2 | 12/2016 | Lee et al. |
| 9,572,079 | B2 | 2/2017 | Somayazulu et al. |
| 9,887,907 | B2 | 2/2018 | Ryu et al. |
| 2007/0097983 | A1 | 5/2007 | Nylander et al. |
| 2007/0121557 | A1 | 5/2007 | Sylvain |
| 2009/0067417 | A1 | 3/2009 | Kalavade et al. |
| 2009/0270099 | A1 | 10/2009 | Gallagher et al. |
| 2010/0040020 | A1 | 2/2010 | Chen |
| 2011/0201336 | A1* | 8/2011 | Garrett .............. H04W 36/0066 455/436 |
| 2011/0206011 | A1 | 8/2011 | Ishida et al. |
| 2011/0250903 | A1 | 10/2011 | Huang et al. |
| 2012/0034910 | A1 | 2/2012 | Fang et al. |
| 2012/0100856 | A1 | 4/2012 | Ishida et al. |
| 2012/0100861 | A1 | 4/2012 | Zhang et al. |
| 2012/0129537 | A1 | 5/2012 | Liu et al. |
| 2012/0202459 | A1 | 8/2012 | Martell et al. |
| 2012/0294278 | A1 | 11/2012 | Wang et al. |
| 2013/0070594 | A1* | 3/2013 | Garcia Martin ...... H04W 28/18 370/235 |
| 2013/0084873 | A1 | 4/2013 | Sharony et al. |
| 2013/0223267 | A1 | 8/2013 | Jung et al. |
| 2013/0273934 | A1 | 10/2013 | Meredith et al. |
| 2013/0309991 | A1* | 11/2013 | Shaw .................... H04W 76/36 370/328 |
| 2013/0344880 | A1 | 12/2013 | Tamura et al. |
| 2014/0036656 | A1 | 2/2014 | Chou et al. |
| 2014/0045505 | A1 | 2/2014 | Henry et al. |
| 2015/0018002 | A1 | 1/2015 | Freda et al. |
| 2015/0038159 | A1 | 2/2015 | Fang et al. |
| 2015/0092551 | A1 | 4/2015 | Moisand et al. |
| 2015/0173004 | A1 | 6/2015 | Nigam et al. |
| 2015/0334643 | A1 | 11/2015 | Maaref et al. |
| 2016/0007255 | A1 | 1/2016 | Sharma et al. |
| 2016/0044531 | A1 | 2/2016 | Papa et al. |
| 2016/0112943 | A1 | 4/2016 | Horn et al. |
| 2016/0127889 | A1 | 5/2016 | Cui et al. |
| 2016/0135106 | A1 | 5/2016 | Shinada |
| 2016/0143015 | A1 | 5/2016 | Marsch et al. |
| 2016/0157147 | A1 | 6/2016 | Saghir et al. |
| 2016/0157252 | A1 | 6/2016 | Lu et al. |
| 2016/0174125 | A1 | 6/2016 | Kobayashi et al. |
| 2016/0183153 | A1 | 6/2016 | Kuo et al. |
| 2016/0191471 | A1 | 6/2016 | Ryoo et al. |
| 2016/0192319 | A1 | 6/2016 | Gao et al. |
| 2016/0227480 | A1 | 8/2016 | Tsuboi et al. |
| 2016/0234759 | A1 | 8/2016 | Kubota et al. |
| 2016/0316479 | A1 | 10/2016 | Choi et al. |
| 2016/0352866 | A1 | 12/2016 | Gupta et al. |
| 2016/0353465 | A1 | 12/2016 | Vrzic et al. |
| 2016/0381528 | A1 | 12/2016 | Lee et al. |
| 2017/0070892 | A1 | 3/2017 | Song et al. |
| 2017/0079059 | A1 | 3/2017 | Li et al. |
| 2017/0111887 | A1 | 4/2017 | Hong et al. |
| 2017/0118689 | A1 | 4/2017 | Zhang et al. |
| 2017/0325274 | A1 | 11/2017 | Xu et al. |
| 2018/0139670 | A1 | 5/2018 | Shaw et al. |
| 2019/0021037 | A1 | 1/2019 | Shaw et al. |
| 2019/0021038 | A1 | 1/2019 | Shaw et al. |
| 2019/0215752 | A1 | 7/2019 | Shaw et al. |
| 2019/0268821 | A1 | 8/2019 | Shaw et al. |
| 2019/0320356 | A1 | 10/2019 | Shaw et al. |
| 2022/0174559 | A1 | 6/2022 | Shaw et al. |

FOREIGN PATENT DOCUMENTS

| | | |
|---|---|---|
| WO | 2015039345 A1 | 3/2015 |
| WO | 2016085109 A1 | 6/2016 |
| WO | 2016107044 A1 | 7/2016 |
| WO | 2016122589 A1 | 8/2016 |
| WO | 2016126238 A1 | 8/2016 |
| WO | 2017012402 A1 | 1/2017 |
| WO | 2017058067 | 4/2017 |
| WO | 2017059829 | 4/2017 |

OTHER PUBLICATIONS

Mayer, Hans-Peter, "H2020—Phases 2 and 3", Bell Labs, Alcatel-Lucent; www.alcatel-lucent.com, Sep. 2014, 1-20.

Van De Velde, Thierry, "Native bridged communication in a cellular access network", https://wifinowevents.com/2016/usa/news-blogs/native-bridged-communication-in-a-cellular-access-network/, Sep. 17, 2016, pp. 1-3.

Westerberg, Erik, "4G/5G RAN architecture: how a split can make the difference", Ericsson Technology Review, Jul. 22, 2016, pp. 1-16.

\* cited by examiner

200

300

400

Communication Devices

700

METHOD AND APPARATUS FOR COORDINATING WIRELESS RESOURCES IN A COMMUNICATION NETWORK

CROSS REFERENCE TO RELATED APPLICATIONS

This application is a continuation of U.S. patent application Ser. No. 16/356,787, filed on Mar. 18, 2019, which is a continuation of U.S. patent application Ser. No. 15/652,127, filed on Jul. 17, 2017 (now U.S. Pat. No. 10,278,108). The contents of each of the foregoing are hereby incorporated by reference into this application as if set forth herein in full.

FIELD OF THE DISCLOSURE

The subject disclosure relates to a method and apparatus for coordinating wireless resources in a communication network.

BACKGROUND

There is an expanding ecosystem off devices people use to access applications and information, or interact with others, and monitor or control processes. This ecosystem goes well beyond desktop, laptop, and tablet computers to encompass the full range of endpoints with which humans might interact. Devices are increasingly connected to back-end systems through various networks, but often operate in isolation from one another. As technology evolves, we should expect connection models to expand, flow into one another and greater cooperative interaction between devices to emerge. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein.

DETAILED DESCRIPTION

Figure 1:
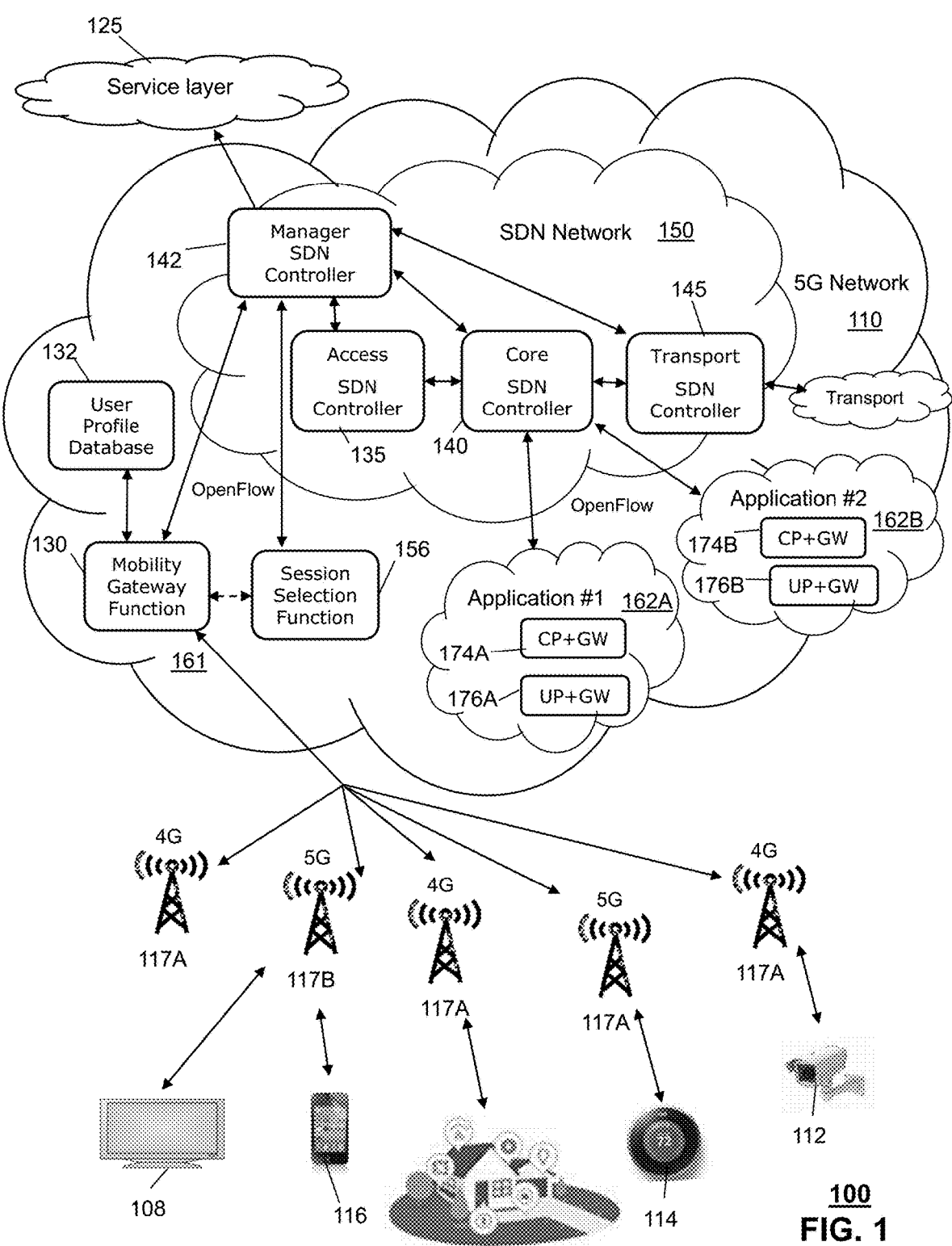
FIG. 1 depicts illustrative embodiments of an exemplary communication network for providing services to communication devices.

The subject disclosure describes, among other things, illustrative embodiments for facilitating services in a wireless communication network. The wireless communication system can include network elements and/or architecture compatible with Fourth Generation (4G) and/or Fifth Generation (5G) networks. The 5G network can utilize Software Defined Network (SDN) elements for controlling and fulfilling the objectives of the 5G network. Embodiments in the disclosure utilizing a 5G network are non-limiting and thereby can apply to any communication system that enables features such as separation of control plane and user plane for carrying signaling traffic and data traffic, respectively, and network slicing. Embodiments in the disclosure utilizing the term SDN are non-limiting and thereby can apply to any software-defined system that enables virtualization of functional aspects of a system.

A 5G network can include a hybrid system for wireless connection. For example, the 5G network can include both 5G and 4G Radio Access Networks (RAN). The 4G RAN can provide broad coverage of a geographic area, such that wireless communication devices can typically use the 4G RAN as a default means to connect to the communication network. The 5G RAN can cover the same geographic regions but may have a more limited capacity, such that wireless communication devices may typically access the 5G network via the 5G RAN when using specific high bandwidth applications (e.g., video streaming) that take advantage of the higher speed capabilities of 5G RAN network elements and architectures. However, the wireless communication devices may use the 4G RAN when accessing lower speed applications. In order to provide broad geographic coverage while limiting investment, the communication system may assign the wireless communication devices to the 5G RAN elements in a selective fashion.

A Management Gateway (MGW) device can oversee a process to allocate the 4G RAN and 5G RAN resources to wireless communication devices to access the 5G network. The MGW device can access information describing coverage areas, capabilities, capacities, and loadings of the 4G RAN and the 5G RAN resources. The MGW device can determine 4G RAN and 5G RAN resources in a geographic area and how connections to wireless communication devices can be shifted between, for example, a 4G RAN access point and a 5G RAN access point, or visa versa. The MGW device can access information describing network requirements (e.g., bandwidth, speed, and loading) associated with applications and services that are requested by wireless communication devices that have connected to the 5G network via the 4G RAN or 5G RAN access points. The MGW device can use the application/service requirements information to determine whether a particular wireless communication device should be serviced by the 4G RAN or the 5G RAN. The MGW device can facilitate switching between the 4G RAN and the 5G RAN, as needed. If, for example, a 5G RAN is to provide access point connectivity for a wireless communication device, the MGW device can receive information describing the location of the wireless communication device. The MGW device can detect overloading of the 5G RAN and can cause communication links to fallback from the 5G RAN to the 4G RAN. In this way, a relatively reduced set of 5G RAN resources can be used to provide high speed services to wireless communication devices over an area that is nominally serviced by a larger number of 4G RAN resources.

One or more aspects of the subject disclosure include a machine-readable storage medium, including executable instructions that, when executed by a processing system including a processor, facilitate performance of operations, including accessing first information associated with a first wireless access network associated with a communication network. The first wireless access network can include a first network capability. The operations can also include accessing second information associated with a second wireless access network associated with the communication network. The second wireless access network can include a second network capability. The first wireless access network and the second wireless access network can provide wireless coverage of a geographic area. The operations can also include determining, according to the first information and the second information, whether to facilitate communication in the geographic area between a first wireless communication device and the communication network via the second wireless access network. Responsive to a determination to facilitate the communication between the first wireless communication device and the communication network via the second wireless access network, the operations can include directing a second wireless access device of the second wireless access network to facilitate the communication between the first wireless communication device and the communication network, and, in turn, directing a first wireless access device of the first wireless access network to stop facilitating second communication between the first wireless communication device and the communication network. The first wireless access device can facilitate the second communication between the first wireless communication device and the communication network according to a default policy.

One or more aspects of the subject disclosure include a management gateway device, comprising a processing system including a processor and a memory that stores executable instructions that, when executed by the processing system, facilitate performance of operations, including accessing first information associated with a first wireless access network associated with a communication network, and accessing second information associated with a second wireless access network associated with the communication network. The first wireless access network and the second wireless access network can provide wireless coverage of a geographic area. The operations can include determining, according to the first information and the second information, whether to facilitate communication in the geographic area between a first wireless communication device and the communication network via the second wireless access network. Responsive to a determination to facilitate the communication between the first wireless communication device and the communication network via the second wireless access network, directing a second wireless access device of the second wireless access network to facilitate the communication between the first wireless communication device and the communication network, and, in turn, directing a first wireless access device of the first wireless access network to stop facilitating second communication between the first wireless communication device and the communication network.

One or more aspects of the subject disclosure include a method including determining, by a processing system including a processor, according to first information associated with a first wireless access network and second information associated with a second wireless access network, whether to facilitate communication in a geographic area between a first wireless communication device and a communication network via the second wireless access network. Responsive to a determination to facilitate the communication between the first wireless communication device and the communication network via the second wireless access network, the method can include directing, by the processing system, a second wireless access device of the second wireless access network to facilitate the communication between the first wireless communication device and the communication network. The method can include directing, by the processing system, a first wireless access device of the first wireless access network to stop facilitating second communication between the first wireless communication device and the communication network.

In a communication network, communication services are typically provided by vendor equipment, which is custom made and/or configured during installation to provide functions necessary for providing desired services. When changes are made to the network, service instantiation and management can require substantial labor to accommodate and/or incorporate new equipment, which may result delayed service instantiation and a system that demonstrates poor dynamic response to changes in network demand. In addition, network flows are generally controlled by a control plane that is associated with the vendor equipment. However, the control plane is often integrated with the data or user plane such that changes to a network element may require re-definition or reconfiguration of a service.

Operation support systems ("OSS") can currently be used to create and/or configure services. However, the process for determining system needs and instantiating equipment can be slow (non-dynamic) and labor intensive, where the service is defined and specified, configured for a chosen vendor network element, coded into a software architecture, and tested.

Some communication network providers are turning to Software Design Network (SDN) solutions to improve network flexibility and change dynamics. For example, network providers may use a SDN controller for provisioning resource and capacity for a mobility core network. However, in these configurations, the core network is a fixed asset within the communication network. SDN controller provisioning can alter performance or control plane assignment of mobility core network components but does not create a fully distributed and dynamically responsive system nor a system that can predict and provide capacity and resource requirements.

Figure 2:
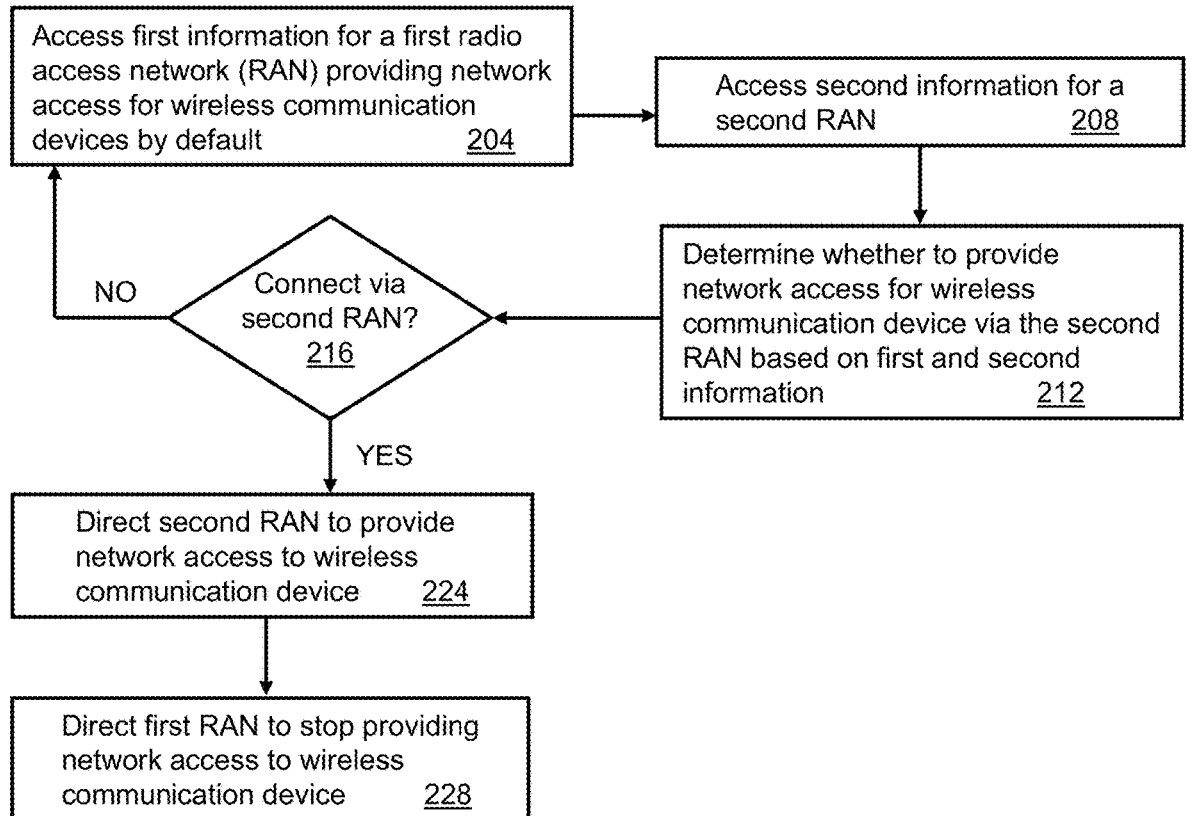
FIG. 2 depicts an illustrative embodiment of a method used in portions of the systems described in FIG. 1.

Referring now to FIG. 1, depicting illustrative embodiments of an exemplary communication system 100 for providing access to a Fifth Generation (5G) Network 110 by leveraging 4G Radio Access Network (RAN) 117A and 5G RAN 117B resources. The 5G Network 110 can provide services to various types of communication devices 116, display and television devices 108, home and business networks, Internet of Things (IoT) devices 114, video and audio devices 112, and so forth. Referring also to FIG. 2, illustrative embodiments are depicted of a method used in portions of the systems described in FIG. 1.

In one or more embodiments, a communications system 100 can include a 5G network 110. The 5G network 110 may optionally include a Software Defined Network (SDN), or SDN Network 150. The SDN Network 150 can be controlled by one or more SDN Controllers 142m 135, 140, 145. For example, the SDN network 150 can include a Manager SDN Controller 142, an Access SDN Controller 135, a Core SDN Controller 140, and/or a Transport SDN Controller 145. The functions of the different types of SDN Controllers 135-145 are further described below. Each SDN Controller, such as, for example and ease of illustration, the Manager SDN Controller 142, can be provided by a computing system executing computer-executable instructions and/or modules to provide various functions. In one or more embodiments, multiple computer systems or processors can provide the functionality illustrated and described herein with respect to each SDN Controller 142. To simplify the description of the concepts and technologies described herein, each SDN Controller 142 is illustrated and described herein as being provided by a single computing system. However, it should be understood that this example is illustrative and therefore should not be construed as being limiting in any way.

In one or more embodiments, the 5G network 110 can include Default Network Slices 161. The Default Network Slices 161 can include sets of Virtual Network Functions (VNF) that provide connectivity between communication devices 116 and the 5G network 110. In one embodiment, the Manager SDN Controller 142 can direct generation and/or instantiation of the Default Network Slices 161 in the 5G network 110. In one or more embodiments, the Default Network Slices 161 can include one or more of the following functions: Management Gateway Function (MGW) 130, Session Anchoring Function (SAF), Session Selection Function 156, and/or SDN Openflow Agent (SOA). In one or more embodiments, once control layer traffic from communication devices 116 enters the core network, initial connections will be directed to the Default (or Proxy) Network Slices 161. The Default Network Slices 161 can coordinate providing information to the Manager SDN Controller 142 such that the Manager SDN Controller 142 can discover pertinent Application-Specific Network Slices 162A-B that have been previously instantiated in the 5G network 110 for providing services to communication devices 116. The Manager SDN Controller 142 can select from among these Application-Specific Network Slices 162A-B for hosting a requested service and can make this selection based on criteria, such as geographic location and/or Quality of Service (QoS) of the services being rendered.

In one or more embodiments, the MGW 130 can capture traffic entering the 5G network 110 from various communication devices 116, 108, 112, and 114 that enters the network via both 4G RAN 117A and 5G RAN 117B. In one or more embodiments, the communication devices can be, without limitation, Smartphone devices, Wearable devices, Smart Home devices, Entertainment devices, Tablets, IoT Consumers devices, or IoT Enterprise devices. The MGW 130 can establish initial connectivity with a connected, wireless communication device 116. Communication traffic from the communication device 116 can anchor in the MGW 130. The MGW 130 can communicate with the SDN Network 150, such as a Manager SDN Controller 142, regarding traffic entering the 5G network 110. In one embodiment, the MGW 130 and the Manager SDN Controller 142 can communicate via an OpenFlow protocol. The MGW 130 can inform the Management SDN Controller 142 of information regarding services sought by one or more communication devices. The Management SDN Controller 142 can analyze these services to determine service functions and/or network data flows that would be required to facilitate delivery of these services to the communication devices 116.

In one or more embodiments, the MGW 130 can instantiate a connection of the wireless communication device 116 with the connecting RAN, either the 4G RAN 117A or the 5G RAN 117B. The communication system 100 can be structured such that it uses a network of 4G RAN 117A and 5G RAN 117B to create a cellular network of broad and inclusive coverage for all geographic areas. In one embodiment, the 4G RAN 117A cell network can provide radio access points with a capability comparable to LTE, while the 5G RAN 117B cell network can provide radio access points with 5G-2 LTE capability. In one embodiment, the network of 4G RAN 117A can serve as default access points for the wireless communication devices 116 to attach to the 5G network 110. For example, a wireless communication device 116 can connect to a 4G RAN 117A to establish communications with the 5G network 110. From this connection, the wireless communication device 116 can access services via the 5G network 110. However, the services that are accessed via the 4G RAN 117A may be in certain ways limited by the capability, capacity, and/or loading extant at the 4G RAN 117A. For example, the 4G RAN 117A will have a maximum network speed and/or bandwidth for delivery of data. This capability can change as loading conditions (e.g., number of devices, voice and data intensity) change at the 4G RAN 117.

In one or more embodiments, the communication system 100 can include 5G RAN 117B cells that function is cooperation with the 4G RAN 117A to provide wireless connectivity to the 5G Network 110. In one embodiment, the 5G RAN 117B cells can provide different capabilities than the 4G RAN 117A. For example, the 5G RAN 117B can be capable of ultra high speed networking that is particularly useful for ultra high definition, video streaming applications. The communication system 100 can provide 5G RAN 117B as a supplement to the 4G RAN 117A. The 4G RAN 117 can provide broad coverage as the default connection for most wireless communication devices 116 and most network applications. However, the 5G RAN 117B can provide supplementary capability for enhancing services, speed, and Quality of Service (QoS). The 5G RAN 117B can also allow the communication system 100 to offload high data intensity services and/or devices from the 4G RAN 117A to the 5G RAN 117B. The communication system 100 can move connections from the 4G RAN 117A to the 5G RAN 117B, or from the 5G RAN 117B to the 4G RAN 117A, based on various characteristics of communication devices 116 connected to the 5G Network 110, the 4G RAN 117A and 5G RAN 117B resources, and user service agreements (SA). The communication system 100 can prioritize use of somewhat limited (and premium) 5G RAN 117B resources to achieve better overall system performance, user satisfaction, and revenue.

In one or more embodiments, the MGW 130 can instantiate a connection with the 4G RAN 117A cells and the 5G RAN 117B cells. The MGW 130 can access information from the 4G RAN 117A and the 5G RAN 117B that describes capabilities, capacity, loading, and/or geographic coverage. For example, the MGW 130 can access information detailing that a given 4G RAN 117A is operating at location X with a geographic coverage area of a two mile radius surrounding location X, a maximum network speed of Y, a maximum loading of Z, and a current loading of Z'. The MGW 130 can access similar information to develop a detailed operational picture of the 4G RAN 117A default network for the geographic region. The MGW 130 can also access the operational information for one or more 5G RAN 117B operating in this same geographic region, where the operating information can also include location, maximum network speed, maximum loading, and current loading. The 5G RAN 117B information can include configuration capabilities that describe the potential coverage areas that can be supported by the 5G RAN 117B in various configurations. For example, the 5G RAN 117B may also be configurable to an omni-directional, two-mile radius.

In one or more embodiments, the MGW 130 can respond to requests for service from wireless communication devices 116, and use these requests (and corresponding service requirements, user priorities, extant loadings, etc.,) to dictate whether these requests are facilitated by the 4G RAN 117A and/or the 5G RAN 117B based on a "user-based pull" of resources from the 5G Network 110. In one embodiment, the MGW 130 can manage the use of the 4G RAN 117A and/or 5G RAN 117B capabilities according to a built-in policy or set of policies. The 4G RAN 117A and/or 5G RAN 117B capabilities can be offered based on a 5G Network "provider-based push" of resources into the geographic area. For example, the MGW 130 can offer the 5G RAN 117B high speed capabilities at specific locations of the geographic region and/or to specific wireless communication devices 116 according to a schedule, according to service agreements that establish priorities between users, according to loading between the 4G RAN and 5G RAN networks, and/or loading of specific 4G RAN 117A cells or 5G RAN 117B cells. In one embodiment, priorities for 4G RAN 117A cells and/or 5G RAN 117B cells may be based on locations (e.g., businesses or homes paying a premium for ability to offer 5G RAN).

In one or more embodiments, the MGW 130 can store a map of 4G RAN 117A resources that are available in the "neighborhood" of each 5G RAN 117B cell. This "neighborhood map" can include a list of 4G RAN 117A in the surrounding area. The neighborhood map information can include not only location information but also capabilities, capacities, loadings, and/or maintenance that is occurring or that is planned. The neighborhood map information can include information for both the 4G RAN 117A and for the 5G RAN 117B. In one embodiment, the neighborhood map can be self-discovered by each 5G RAN 117B cell. In this case, the 5G RAN 117B can "test its surroundings" by communicating with the 4G RAN 117A cell sites that surround it and that are accessible to it via wireless communications. The MGW 130 can request and receive the neighborhood information from the 5G RAN 117B, or the 5G RAN 117B can report its neighborhood information to the MGW 130 on a periodic basis.

In one or more embodiments, the MGW 130 can dynamically reassign a communication device 116 from a 4G RAN 117A cell to a 5G RAN 117B cell, or from a 5G RAN 117B cell to a 4G RAN 117A cell. The dynamic reassignment can be based on any, or any combination of, characteristics of the 4G RAN 117A, the 5G RAN 117B, and communication devices 116 connected to these access points. The MGW 130 can dynamically reassign devices based on local up-to-date traffic conditions at each 4G RAN 117A and 5G RAN 117B cell.

In one or more embodiments, the MGM 130 can receive one or more requests from wireless communication devices 116 for services. The MGW 130 can analyze one or more service requests to identify which services require capabilities or capacities that are available at the 5G RAN 117B. For example, the MGW 130 can determine which wireless communication devices 116 have requested services requiring ultra high speed delivery. The MGW 130 can further process and sort the requests by determining user service agreements of the communication devices 116. The MGW 130 can use the requirements and service agreement analysis to determine how to prioritize the available 5G RAN 117B resources. Meanwhile, the MGW 130 can direct that service requests for all other wireless communication devices 116 continue to be serviced on the 4G RAN 117A, where they will receive nominal (e.g., medium/low speed delivery) via the 4G RAN 117A access points.

In one or more embodiments, the 5G Network 110 can determine priority between a newly request data service and an on-going data service. For example, a first communication device 116 may be receiving an on-going data service from the 5G Network 110, when a second communication device 116 requests a new data service from the 5G network 110. In one embodiment, the MGW 130 can query a User Profile Database 132 and retrieve user profiles for particular users, such as the users of the communication devices 116.

The MGW 130 can compare the priorities between the new or incoming data service and old or on-going data service.

In one or more embodiments, the MGW 130 can determine whether an automatic, inter-domain function for 5G-to-4G (or 5G-2-LTE) should be turned OFF or stay ON. If a user of a communication device 116 is are a premium customer, then the communication device 116 may get to use the 5G RAN 117B all the time. Conversely, the 5G Network 119 may lock a communication device 116 onto the 4G RAN network 117A, because the 4G RAN 117A network is more suited to mobility (i.e., no drop offs) than the 5G RAN 117B network.

In one or more embodiments, if the old or on-going data service that is provided by the 5G Network 110 has priority, then the inter-domain 5G-2-LTE can be turn OFF. In this case, the 5G Network 110 can continue to provide the on-going data service via the 5G RAN 117B cell. In this case, the 5G Network 110 can then redirect the new or incoming data service to the second communication device 116 to the LTE or 4G RAN 117A cell. In one or more embodiments, provided that the incoming service, such as a new voice data service, is, in fact, more important, then the Inter-Domain 5G-2-LTE can be turned ON. The MGW 130 of the 5G Network 110 will perform the Inter-Domain 5G-2-LTE, and the initiate the incoming, Data Service can stay on the 5G Domain (5G RAN cell 117B). In one or more embodiments, the MGW 130 can downgrade an on-going data service to the LTE domain, such that the service is provided to the communication device 116 via that 4G RAN 117A cell.

In one or more embodiments, the 5G Network 110 can provide an intelligent Inter-Domain 5G-2-LTE management system and method for controlling a Hybrid 5G-to-LTE network, where optimum network performance and user experience can be achieved. The Hybrid 5G/LTE Network is based on Dual 5G and LTE radio coverage.

In one embodiment, the Hybrid 5G/LTE Network can determine if the 4G RAN 117A and/or the 5G RAN 117B have entered an "Overloaded" and/or "Congested" state. In one embodiments, the MGW 130 can auto trigger the Inter-Domain 5G-2-LTE Management Switch. When user equipment, such as a communication device 116, enters into the Hybrid 5G/LTE Network, then the MGW 130 of the 5G Network 110 can "proactively and immediately" query and/or request from the User Profile database information, such as a list of high priority voice and data services for each user. The User Profile Database 132 (e.g., UPD) can then "proactively and immediately" look-up and then push a "response" to the MGW 130, which can include a list of high priority voice and data services for the user equipment or communication device 116.

In one or more embodiments, the 5G Network 110 can receive a first data service request from a first communication device 116. The 5G Network, such as the MGW 130, can extract a first data service identifier from the first service request. The MGW 130 can use this first data service identifier to identify the service or to identify a type or category of service. In one embodiment, then 5G Network 110 can perform the first data service in the 5G domain and can provide the first data service with either the 4G RAN 117A or the 5G RAN 117B as dictate by the needs of the first service and/or the priority of the user of the communication device 116. In one embodiment, the 5G Network 110 can then receive as second (Incoming) Data Service Request from a second communication device 116. The MGW 130 can determine the priority of the second data request and can compare this priority to the priority of the On-going first data service that the 5G is already providing to the first communication device via the 5G RAN 117B. In one embodiment, the MGW 130 can query the User Profile Database 132 and can retrieve user profile information for the users of the first communication device 116 and the second communication device 116. The 5G Network, via, for example, the MGW 130, can compare user priorities and/or user device priorities and/or data service priorities between the incoming second data service and the ongoing first data service. Any, or any combination, of these priorities can be used to determine whether the 5G Network 110 will turn the Inter-Domain 5G-2-LTE OFF or ON due to the addition of the second communication device. In another embodiment, the 5G Network 110 can user any, or any combination, of the these priorities to determine whether to put the second communication device 116 on the 5G RAN 117B or the 4G RAN 117A and whether or not to switch the first communication device 116 from the 5G RAN 117B to the 4G RAN 117A in response to the addition of the second communication device 116.

In one embodiment, the 5G Network 110 or the MGW 130 may determine that providing the ongoing first data service is more important than providing the new, incoming second data service, such that the Inter-Domain 5G-to-LTE function can be turned OFF with respect to the first communication device 116. In this case, the Network 110 can continue providing the first data service in 5G domain (using the 5G RAN 117B), and the 5G Network 110 can redirect the second data service to the LTE or 4G RAN 117A cell network.

In one embodiment, the 5G Network 110 or the MGW 130 may determine that providing a second data service to the second communication device 116, such as an incoming voice data service, is more important than the on-going first data service that is being provided to the first communication device 116. In this case, the Inter-Domain function for a 5G-to-LTE transition can be turned ON for the first communication device 116. The 5G Network 110 can perform Inter-Domain 5G-to-LTE transition to downgrade the on-going first data service to the LTE domain for the first communication device 116, while the 5G Network 110 can make the incoming second data service stay on 5G Domain (assuming that it has been initiated on the 5G RAN 117B).

In one or more embodiments, the 5G Network can intelligently schedule between low/medium and high priority service sessions. For example, a first communication device 116 can be connected on the hybrid 5G/LTE network (i.e., connected via either a 4G RAN 117A cell or a 5G RAN 117B cell). If the user of the first communication device 116 is not being provided with an on-going data service, and if a low priority service call comes in, then the 5G Network 110 can fall back to the 4G or LTE network. In this example, the incoming, low priority service call can be conducted in the 4G or LTE network of the 5G Network 110. In another example, if the user of the first communication device 116 is, in fact, currently being provided with a high priority service session, and if a low priority service call comes is requested for the second communication device, then the incoming, low priority service call can be conducted by the 5G Network 110 using the LTE or 4G RAN 117A while continuing the on-going, high priority service session can be continued by the 5G Network 110 using the 5G RAN 117B.

In another example, the 5G Network can be providing a low priority service session to a first communication device 116, but the capacity of the 5G RAN 117B network is such that the first data service associated with the low priority service session can be provided by the 5G RAN 117B cell.

However, a request can come in from a second communication device 116 at the 5G RAN 117B for a high priority and/or emergency service call. The 5G Network 110 can re-direct the on-going low priority service call from the 5G RAN 117B to the 4G RAN 117A (or LTE) so that the incoming, high priority service session can be serviced by the 5G RAN 117B cell.

In one or more embodiments, the 5G Network 110 can provide the user or the network with a capability for turning ON the Inter-Domain 5G-to-LTE function—where an on-going medium/low priority data session is automatically moved to the 4G RAN 117A when a high priority or emergency data session comes in. In one or more embodiments, the 5G Network 110 can provide the user or the network with a capability to turn OFF the Inter-Domain 5G-to-LTE function when a non-emergency or low-medium priority data session is requested. That is, an on-going data session does NOT automatically switch to the 4G RAN 117A upon receipt of an incoming data session in cases where the incoming sessions is low/medium priority or is not an emergency session.

In one or more embodiments, the 5G Network 110 can provide the user or the network with an intelligence capability for comparing a priority between an on-going high priority service session and an incoming low priority service call. Via the comparison, the 5G Network 110 can determine whether to turn ON or turn OFF the Inter-Domain 5G-to-LTE function (or management switch). In one example, where a high priority service session is ongoing and then a low-medium priority call comes in, the 5G Network 110 can automatically turn OFF the Inter-Domain 5G-to-LTE function (or management switch). The on-going high priority service can then automatically stay on the 5G RAN 117B. The incoming, low/medium priority service can be serviced by (or fall back to) 4G RAN 117A. Disable INTER-DOMAIN 5G-2-LTE. In another example, a request for an on-going a low-medium priority service session can be serviced when a request for an emergency or high priority call comes in. The 5G Network can automatically turn ON the Inter-Domain 5G-to-LTE function or management switch, so that the on-going, low-medium priority service session can fall back to the 4G RAN 117A (or LTE). The incoming emergency or high priority call can then be serviced by the 5G RAN 117B.

In one or more embodiments, the 5G Network 110 can include a Session Anchoring Function (SAF) that can allow an initial connection of the communication device 116 to anchor control plane communication traffic in the default Network Slice 161. In one embodiment, the SAF can ensure session continuity over the communication session in light of subsequent changes in user plane communication routing by hair pinning of the control plane connectivity. In one embodiment, the SAF can enable slice chaining of the connectivity. In a slice chaining event, the default Network Slice 161 can process the user plane communication traffic associated with the communication device 116 prior to routing this user plane communication traffic between the communication device 116 and a second Network Slice 162A-B. Slice chaining can be made conditional on the complexity of a service that is requested by a communication device 116. For example, the default Network Slice 161 may be capable of facilitating providing one service to the communication device 116 but not capable of providing a second, more complex service. In such a case, the 5G network 110 may enlist a second Network Slice 162A to provide the more complex service. In one scenario, all communications with the communication device 116 may transfer to the second Network Slice 162A, which will become the anchor for the further control and user plane traffic for the device 116. In another scenario, the Network Slice 161 can remain the anchor for control plane traffic, while all user plane traffic is processed at the Second Network Slice 162A. In yet another scenario, the Network Slice 161 can retain control plane processing and a portion of the user plane processing, while sharing a portion of the user plane processing with the Second Network Slice 162A. Where the Network Slice 161 retains a portion to the user plane processing, the Network Slice 161 and the second Network Slice 161A (or additional Network Slices 162A-B) can form a slice chain for providing the service to the communication device 116. By enlisting secondary Network Slices 162A-B that have been previously instantiated in the 5G network 110, the communication device 116 can be provided with premium functionalities, such as improved QoS and premium connectivity. In one example, a user of a communication device 116 may have a subscriber's license agreement that provides for access to these premium-level services, and the 5G network 110 can use secondary Network Slice selection and/or chaining to achieve these higher levels of service (and charge additional fees in the process).

In one or more embodiments, the 5G Network 110 can include a Session Selection Function (SSF) 156 that can enable the default Network Slice 161 to intercept the communication traffic from the communication device 116. The SSF 156 can determine characteristics of the communication device 116, the access network 117, the connectivity to the 5G network 110, and/or one or more services that are requested by the communication device 116. For example, the SSF 156 can determine Policy capabilities, Security capabilities, Billing function capabilities, and/or QoS capabilities of the communication device 116, the access network 117A and 117B, the connectivity to the 5G network 110, and/or one or more services that are requested.

In one or more embodiments, the 5G Network 110 can include a SDN Openflow Agent (SOA) that can communicate with the MGW 130 and/or the Manager SDN Controller 142. In one embodiment, the SOA can transmit information to the Manager SDN Controller 142 regarding the characteristics of the communication device 116, the access network 117, the connectivity to the 5G network 110, and/or one or more services that are requested by the communication device 116. For example, these characteristics can be sent to the Manager SDN Controller 142 along with a request for a service, which the communication device 116 wants to access. The Manager SDN Controller 142 can use these characteristics to determine, not only which service the user communication device 116 wants to run, but also the characteristics and capabilities that need to be present for the selected service to work optimally at the device 116.

In one or more embodiments, once the Manager SDN Controller 142 selects a particular Network Slice 162A from the available Network Slices 162A-B already instantiated in the 5G network 110, then Manager SDN Controller 142 can direct the default Network Slice 161 to redirect traffic from the Network Slice 161 to the selected Network Slice 162A. In one embodiment, the SOA can function as a SDN switch in order to dynamically redirect the user plane communication traffic of the communication device 116 into the selected Network Slice 162 according to the Manager SDN Controller 142 command.

In one or more embodiments, the SDN Network can control, direct, configure, and monitor default Network Slices 161 and secondary Network Slices 162A-B. The secondary Network Slices 162A-B can include Core Resources 174A-176B for the Core Network of the 5G network 110, such as Gateways (GW) for Control Plane (CP) 174A-C, User Plane (UP) 176A-B, and/or Legacy (i.e., combined user and control plane).

In one or more embodiments, the communication system 100 can include a Service Layer 125. The Service Layer 125 can provide access to third-party services and applications at a higher application layer. The Service Layer 125 may include capability servers, owned by the operator of the 5G network 110 that can access and provide access to application layer servers owned by third-party content providers via open and secure Application Programming Interfaces (APIs). The Service Layer 125 can also provide an interface to a Core Network. The 5G network 110 can also include access to Applications, such as Fixed Applications and Mobile Applications.

In one or more embodiments, the Manager SDN Controller 142 can facilitate a controlling mechanism for a Service Provider (SP). The SP can provide communications services to subscribing devices 116. For example, the SP can provide wireless communication connectivity, telecommunication services, and access to various kinds of data and media services to communication devices 116 via the 5G network 110. In one or more embodiments, the SP can be a physical provider of services or a virtual provider of services or a combination of both physical and virtual. A virtual SP can purchase services from another SP (which can be a wholesale SP) so that customers of the virtual SP can access telecommunication and/or Internet services via one or more Points of Presence (PoPs) that are owned and operated by the wholesale SP.

In one or more embodiments, the Manager SDN Controller 142 can access and/or direct network components that span various network architectures, levels, and/or locations. The Manager SDN Controller 142 can directly or indirectly control or coordinate activities at the cloud or network levels typically associated with the provider domain. The Manager SDN Controller 142 can directly or indirectly control or coordinate activities within customer domains, such as at the device level, the premises or business level, and/or the vehicle level.

In one or more embodiments, the SDN Network 150 and the sub-resources under the SDN Network 150, such as the Manager SDN Controller 142 and/or other SDN Controllers 135-145 can be resources that are controlled and/or directed by the SP for use in fulfilling the system requirements of the 5G network 110. These SDN Network resources may be available to the SP via any number of arrangements, including ownership, leasing, purchasing, and/or sharing. In some embodiments, the SP may own all of these resources. In other embodiments, the SP may only some but not all. In other embodiments, the SP may not own any of these resources. Similarly, certain other parts of the 5G network 110, such as the MGW 142, the Mobile Applications 162A-B and/or Fixed Applications, the Core Resources 174A-176B, and/or the Radio Access Networks (RAN) 117A and 117B may be controlled and/or directed by the SP, via the MGW 130, for use in fulfilling the system requirements of the 5G network 110. These 5G Network resources may be available to the SP via any number of arrangements, including ownership, leasing, purchasing, and/or sharing.

In one or more embodiments, each SDN Controller 135-145 can include various components and/or can be provided via cooperation of various network devices or components. For example, each SDN Controller 142 can include or have access various network components or resources, such as a network resource controller, network resource autonomous controller, a service resource controller, a service control interpreter, adapters, application programming interfaces, compilers, a network data collection and/or analytics engine. Each SDN Controller 142 also can include or access information describing available resources and network information, such as network object statistics, events or alarms, topology, state changes. In one or more embodiment, each SDN Controller 142 can use and/or can generate and/or access system configurations, including configurations of resources available to the Manager SDN Controller 142 for proving access to services.

In one or more embodiments, the communication network 100 can include an SDN Network 150. The SDN Network 150 can include one or more SDN Controllers 142, 135, 140 and 145 that can provide different types of functions and can be arranged in virtual layers. For example, the SDN Network 150 can include a Manager SDN Controller 142 that controls and coordinates functioning of the SDN Network 150. The Manager SDN Controller 142 can be a top-level Management System in the architecture. Below the Manager SDN Controller 142, a next level of SDN Controllers 135, 140 and 145 can be instantiated and configured by the Manager SDN Controller 142 to provide specific classes of functionality in the architecture. For example, the Manager SDN Controller 142 can provide level 3 functionality to control and coordinate service control, configuration, and data flow in the communication network 100. The Manager SDN Controller 142 can, as needed, instantiate, configure, and direct level 2 SDN Controllers 135, 140 and 145 for controlling Access, Core, and Transport capabilities in the communication network 100.

Referring specifically to FIG. 2, in one or more embodiments, in step 204 of method 200, the Management Gateway (MGW) 130 can access first information for a first radio access network (RAN) providing network access for wireless communication device by default. The first RAN can be a 4G RAN that serves as a default RAN for a 5G Network. The first information can be the subject of a request from the MGW 130 or a request from a second RAN, such as a 5G RAN. For example, a 5G RAN that serves as a premium speed RAN for the 5G network, can collect information from neighboring 4G RAN cells. In step 208, the MGW 130 can access second information from a second RAN. For example, the 5G RAN cell can provide information to the MGW 130 for the 5G RAN and/or the 4G RAN. The RAN cell information can include capability, capacity, loading, and other information that can be used by the MGW 130 for determining how best to allocate the 5G RAN cell capacity.

In one or more embodiments, in step 212, the MGW 130 can determine whether to provide network access for a wireless communication device via the second RAN based on the first and second information. For example, a wireless communication device can be connected to a 4G RAN cell by default. The MGW 130 can analyze the first and second information describing the capabilities, capacities, and/or loadings of the 4G RAN and the 5G RAN, as well as information regarding a requested service and/or user service agreement for the wireless communication device. The MGW 130 can determine whether to leave the wireless communication device with the 4G RAN cell or to move the device to the 5G RAN cell. If the MGW 130 determines to move the device to the 5G RAN cell, at step 216, then, at step 224, the MGW 130 can direct the second RAN to provide network access for the wireless communication device and, in turn, can direct the first RAN to stop providing network access for the wireless communication device. For example, the MGW 130 can direct the 5G RAN to initiate network service to the 5G Network and the 4G RAN to stop network service to the 5G Network.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, the SDN Network 150 can allow the communication network 100 to separate control plane operations from a data plane operations and can enable layer abstraction for separating service and network functions or elements from physical network functions or elements. In one or more embodiments, the Manager SDN Controller 142 can coordinated networking and provision of applications and/or services. The Manager SDN Controller 142 can manage transport functions for various layers within the communication network and access to application functions for layers above the communication network. The Manager SDN Controller 142 can provide a platform for network services, network control of service instantiation and management, as well as a programmable environment for resource and traffic management. The Manager SDN Controller 142 also can permit a combination of real time data from the service and network elements with real-time or near real-time control of a forwarding plane. In various embodiments, the Manager SDN Controller 142 can enable flow set up in real-time, network programmability, extensibility, standard interfaces, and/or multi-vendor support. In one embodiment, interactions between layers of the communication network 100 can be based upon policies to determine optimum configuration and rapid adaptation of the network 100 to changing state and changing customer requirements for example, predicted demand, addition of new users, spikes in traffic, planned and unplanned network outages, adding new services, and/or maintenance.

In one or more embodiments, the SDN Network 150 can support legacy and emerging protocols through the use of adapters, including, but not necessarily limited to, configurator or adapters that can write to the network elements, and listening adapters that can collect statistics and alarms for the data collection and analytic engine as well as for fault and performance management. Modularity of the Manager SDN Controller 142 can allow the enable functions, such as compiling, service control, network control, and data collection and analytics, to be optimized and developed independently of the specific vendor network equipment being controlled.

In one or more embodiments, the SDN Network 150 can enable separation of service control from network resource control. This separation can enable abstraction of service definitions from particular types of network resources that are selected and used for implementation of services. For example, a service can be defined by the Manager SDN Controller 142 independently of actual network layer and vendor specifics. Access service features can be separated from flow service features and can thereby connect to different types of flow services quickly. In one embodiment, customers can access services over a connection that can be added, removed, evolved, combined, or otherwise modified and that may no longer be tied to the service. In one or more embodiments, the Manager SDN Controller 142 can creation of a set of saved configurations, templates, and/or building blocks for creating and providing a service. A customer can pick an access path (e.g., DSL, Broadband, Private Line, IP, VPN, etc.) that is independent of a service that has been selected. In one embodiment, this approach can provide several benefits such as, for example, more rapid instantiation of network elements and addition of new services, matching network features, performance, and capabilities to customer needs on-demand, and allocation of network resources for an individual customer while maintaining network and operational efficiencies.

In one or more embodiments, each SDN Controller 135-145 can instantiate a virtualized environment including compute, storage, and data center networking for virtual applications. For example, the Manager SDN Controller 142 can direct on-demand instantiation of network elements, such as Virtual Network Function (VNF) elements at on-demand locations to support network services for a customer or for the autonomous network resource controller where capacity is needed or where backup of network elements due to failures. Service functions can be moved and/or changed in response to traffic flow rather than traffic flow moving to the desired service functions.

In one or more embodiments, the Manager SDN Controller 142 can cooperate with a cloud orchestrator in instantiating level 2 SDN Controllers 135-145 and network services to support the network configuration in connecting Virtual Machined (VMs) that the cloud orchestrator is setting up. The network instantiation and configuration can include configuration of the virtual networks, which may operate at various physical levels in a cloud server architecture, including hypervisor, top of rack, cloud network fabric, and/or IP provider edge, which can connect the cloud network with the service provider WAN network. In one or more embodiments, the level 2 SDN Controllers 135-145 can cooperate with a cloud orchestrator in instantiating VNF elements for use in, for example, the Core Network.

In one or more embodiments, the SDN Controllers 142-145 can be configured to access information describing models of services that can be provided to communication devices. Formal data models and/or templates can be inputs into the network resource controller, which can compile and create the actual steps necessary to configure the vendor specific network elements. The formal information data or models can enable separation of service definitions from vendor specific implementations. In one or more embodiments, for example, the Manager SDN Controller 142 can use service and networking templates stored at or accessible to the Manager SDN Controller 142 and assemble a service from the templates. The Manager SDN Controller 142 can also translate information data and/or models describing services into programmable logic modules, where a programmable logic language can be used to define service and network templates. These templates can be matched to the desired service features, the matched templates can be assembled by the Manager SDN Controller 142. The template-based service representation can be compiled by the software defined network controller, and the compiled template-based service representation can be validated using emulated field test environments to validate the service. After validation, the service can be ready for instantiation on the network and the Manager SDN Controller 142 can interact with network elements to deploy the service and/or can issue commands to effect the deployment.

In one or more embodiments, a communication device 116 can operate in communication with and/or as a part of a communications network 100. The functionality of the communication device 116 may be provided by one or more server computers, desktop computers, mobile telephones, smartphones, laptop computers, set-top boxes, other computing systems, and the like. It should be understood that the functionality of the communication device 116 can be provided by a single device, by two similar devices, and/or by two or more dissimilar devices. For purposes of describing the concepts and technologies disclosed herein, the communication device 116 is described herein as a workstation or personal computer. It should be understood that this embodiment is illustrative, and should not be construed as being limiting in any way.

The communication device 116 can execute an operating system and one or more application programs. The operating system can be a computer program that controls the operation of the communication device 116. The application programs can be executable programs that are configured to execute on top of the operating system to provide various functions. According to various embodiments, the application programs can include web browsers, productivity software, messaging applications, combinations thereof, or the like. In one or more embodiments, the application programs of the communication device 116 can include applications that enable interactions between the communication device 116 and other devices or entities. In some contemplated embodiments, the application programs can provide functionality for interacting with and/or communicating with the communication network 100 and, in turn, having communications analyzed by the Manager SDN Controller 142 or, alternatively, any of the SDN Controllers 135-145 in the SDN Network 150.

According to various embodiments, the SDN Network 150 can include and/or access resources, such as a service orchestrator, a software defined network controller, a cloud orchestrator 116, and/or other elements. It should be understood that the Manager SDN Controller 142, and any of the above-described components, or combinations thereof, may be embodied as or in stand-alone devices or components thereof operating as part of or in communication with the communication network 100. As such, the illustrated embodiment should be understood as being illustrative of only some contemplated embodiments and should not be construed as being limiting in any way.

In one or more embodiments, the SDN Network 150 can enable a shortened service conception-to-deployment timeline, as well as enabling improved service management functionality. In particular, the Manager SDN Controller 142 can receive or obtain the service request from the communication device 116 or from any other requesting source. According to various embodiments, the service request can be received as a request to order. In one embodiment, the service request can be in the form of a programming language file, which can be written in various languages and/or can include various types of models or the like. In some contemplated embodiments, the service request is provided by one or more Yang files, one or more XML files, one or more hypertext markup language ("HTML") files, one or more scripts and/or programming language files, files in other languages or formats, combinations thereof, or the like.

In one or more embodiments, the SDN Network 150 can automatically evaluate application service requirements that have been requested from the 5G network 110. In one embodiment, a service request can be received from a customer or customer device. For example, a request can be receive via a portal. The service request can be provided to the soft Manager SDN Controller 142 for service creation, instantiation, and management. According to various embodiments, the service request can be analyzed by the Manager SDN Controller 142. In one embodiment, the Manager SDN Controller 142 can access or query the Service Layer 125 to determine service requirements needed for fulfilling the service request.

In one or more embodiments, a service request can be received by a customer (e.g., via the portal), and provided to the SDN Network 150 for service creation, instantiation, and management. The service request can include application objects and/or requests for particular services or functions. Thus, the service request can include objects that define service functions that are desired, requests for generation of services and/or requests for particular functionality, queries, combinations thereof, or the like. It should be understood that these examples are illustrative and therefore should not be construed as being limiting in any way. According to various embodiments, the service request can be analyzed by the software defined network controller and a set composed of a directed graph and the associated model or model files are selected. The model can define features of the service and can generate in a programming language or format such as XML, Yang models, other types of files, combinations thereof, or the like. The selected directed graph can be used at runtime to fill in the event-specific details from the application programming interface ("API"), the resource allocations per the directed graph and the resource model, and one or more state changes in the network through the adapters.

In one or more embodiments, the Manager SDN Controller 142 can include, expose, and/or communicate with a portal 120. The functionality of the portal 120 can be provided, in various embodiments, by an application hosted and/or executed by a computing device such as a server computer, a web server, a personal computer, or the like. In some other embodiments, the functionality of the portal can be provided by a module or application hosted or executed by one or more computing devices. Thus, it can be appreciated that the functionality of the portal can be provided by a hardware or software module executed by one or more devices that provide the software defined network framework and/or by other devices. Because the portal can be provided in additional and/or alternative ways, it should be understood that these examples are illustrative and therefore should not be construed as being limiting in any way.

In one or more embodiments, the communication device 116 can communicate with the communication network 100 via a wireless communication link. For example, the communication device 116 can be a mobile communication device 116 that communications via a cellular communication link through a Radio Access Network (RAN) technology. A mobility network 117A, 117B, such as an LTE network, a 4G RAN 117A, or a 5G RAN 117B can establish wireless communications with the communication device 116, where the communication device 116 can move from cell to cell while maintaining a communication session. In another example, the communication device 116 can communication with the communication network via a WiFi network link. The WiFi network can be, for example, a local area network (LAN) that is supported by a router capable of wireless communications or can be an individual device, such another mobile communication device 116 capable of acting as an intermediary (e.g., a Hot Spot). In one or more embodiments, the communication network 100 can be a converged network capable of supporting a wide range of access, core and transport networks, such as wireline, wireless, satellite, 3GGP, non-3GPP, and/or 5G.

In one or more embodiments, the communication device 116 can establish a session with a portal. The portal can be a function of an application that is resident at the communication device 116 as a stand-alone application or as a client application to a server application of the 5G network 110 or a third party. The portal functionality enables the communication device 116 to define or request particular service features either directly or indirectly. According to various embodiments, the communication device 116 can provide to the portal, or can define via the portal, a service request. In one or more embodiments, the service request can include service feature data that represents service features desired or needed in a service being created and/or instantiated via the Manager SDN Controller 142. Alternatively, the service request can be a bare request for access to a service. In this case, the Manager SDN Controller 142 can determine the nature of the service and the functionality/resources required for providing the service.

In one or more embodiments, the Manager SDN Controller 142 can query the Service Layer 125 to determine the functional and/or resource requirements to provide the service to the communication device 116. In one or more embodiments, the service requirements can include service feature data. In one or more embodiments, this service feature data can be generated by or provided to the Service Layer 125 and/or the Manager SDN Controller 142 via interactions between the communication device 116 and the portal. For example, in the process of making the service request, the communication device 116 can make a series of selections from menus, drop-down lists, fields, tables, or other data or object selection mechanisms that may be provided by the portal and/or the application programs executing on the communication device 116. In some embodiments, the application programs can include a web browser application or other application that can obtain data from the portal. In one or more embodiments, the application programs can use the data to generate and present a user interface at the communication device 116. The user interface can include possible service features, and a user or other entity can select the desired features, drag and drop desired features, and/or otherwise indicate desired features in a service.

In one or more embodiments, regardless of the specific technique for capturing and/or deriving service features, using interactions between the communication device 116 and the portal, and the service feature data can represent feature choices or definitions made. In one embodiment, the portal can be configured to obtain the service feature data and to generate and/or output the service data as a programming file or in a programming file format. In one embodiment, the portal can be supported or directed by the Manager SDN Controller 142. It should be understood that these examples are illustrative and therefore should not be construed as being limiting in any way.

In one or more embodiments, the SDN Network 150 can analyze the service data or information and identify service features indicated by and/or associated with the requested service. Based upon the service request and/or service data, the Manager SDN Controller 142 can identify one or more service features associated with a service. As used herein, a "service feature" can be used to refer to an operation, a set of operations, a process, a method, a combination thereof, or the like associated with a service. Thus, for example, if the service provides the ability to check an email service for new messages, the feature identified by the Manager SDN Controller 142 can correspond to checking for new email messages. It therefore can be appreciated that any function, functionality, set or subset of functions or functionality, processes or set of processes, method flows, work flows, combinations thereof, or the like can correspond to a service feature. As such, the above example should be understood as being illustrative of one example feature and therefore should not be construed as being limiting in any way.

In one or more embodiments, the Manager SDN Controller 142 can analyze the service request and/or other implementation of the service data to identify each of one or more features associated with the requested service. The identification of service features can be iterated by the Manager SDN Controller 142 until each feature is identified. Upon determining that additional features associated with the service do not remain, the Manager SDN Controller 142 can generate and select a service model, template, and/or program that represents the requested service. In one embodiment, the Manager SDN Controller 142 can receive a service model.

In one or more embodiments, the Manager SDN Controller 142 can analyze policies or policy defined for a service. This policy can include network engineering rules, which can be defined by a network designer, engineer, business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

In one or more embodiments, the Manager SDN Controller 142 can determine from the service model one or more physical network functions or other resources that will be needed or used to support the service. The Manager SDN Controller 142 also can analyze the service model to identify one or more virtual network functions or other functions that will support or provide the features of the service. The Manager SDN Controller 142 also can determine, via analysis of the service model, process flows between the various resources and/or functions used to support or provide the service features.

In one or more embodiments, the Manager SDN Controller 142 can select service and networking templates stored at or accessible to the Manager SDN Controller 142. Features requested in the service request can be matched to the templates, and the Manager SDN Controller 142 can assemble a service from the templates. In one embodiment, the Manager SDN Controller 142 can compile the assembled templates and with a real time network map, create a directed graph that can configure the network elements based on a specific sequence defined by the directed graph. Upon successful validation, the Manager SDN Controller 142 can interact with network elements such as a service orchestrator and a cloud orchestrator to instantiate resources to perform functions, including computing, storage, and local networking in a virtual environment, and to instantiate the service. In one or more embodiments, the Manager SDN Controller 142 can configure physical and virtual network functions and a cloud orchestrator can instantiate the virtual network functions (e.g., virtual machines ("VMs")). After virtual network function instantiation, the Manager SDN Controller 142 can configure, monitor, and manage the service. In one or more embodiments, the Manager SDN Controller 142 can receive or get events from the network and trigger a directed graph to execute the logic of the intended service, feature, or flow.

In one or more embodiments, if the SDN Network 142 implements a multiple level, dynamic design, then the Manager SDN Controller 142 of the SDN Network 150 can automatically prioritize and instantiate a next lower level (e.g., level 2) SDN controller including an Access Network SDN Controller 135, a Core Network SDN Controller 140, and/or a Transport Network SDN Controller 145 on the fly. Generally, the Manager SDN Controller 142 can instantiating at least one set of these level 2 SDN Controllers 135-145 to provide baseline functionality and connectivity for a least one communication device 116. As server requests are processed, the Manager SDN Controller 142 can evaluate the service request requirements (i.e., the service features) and compare the required resources and capacities for these resources with the resources and capacities currently available at the SDN network 150 via the level 2 SDN Controllers 135-145. In one embodiment, the Manager SDN Controller 142 can communicate with each of the instantiated SDN controllers via a communication interface, such as an Open-Flow interface. In addition, the SDN Controllers 135-145 of level 2 to can communicate among themselves to determine resource capabilities, capacities, shortages, failures, and/or warnings. In one or more embodiments, if the Manager SDN Controller 142 determines that the requested service can be performed, within system margins, using the currently instantiated SDN Controllers 135-145, then the Manager SDN Controller 142 can decide to direct the SDN Controllers 135-145 to perform the service for the communication device 116. Alternatively, if the Manager SDN Controller 142 determines a shortage or shortfall in a needed resource, then the Manager SDN Controller 142 can direct instantiation of one or more new SDN Controller 135-145 to perform all or part of the requested service. For example, the Manager SDN Controller 142 may determine that the service request associated with the communication device 116 or many communication devices 116 or merely received at the 5G network 110 from an indeterminate device (e.g., a request for resources from another network) requires additional Core SDN Controller capacity 140. In this case, the Manager SDN Controller 142 can direct the instantiation of additional Core SDN Controller 140 capacity from a set of configurable SDN Controller devices at the cloud.

In one or more embodiments, level 2 SDN Controllers 135-145, including Access SDN Controller 135, Core SDN Controller 140, and Transport SDN Controller 145 can control devices at level 1 of the communication network 100. For example, the Access SDN Controller 135 can control, direct, configure, and monitor Access Resources 117 and 119 for the network 100, such as eNodeB controllers, RAN controllers, and or WiFi controllers. In another example, the Core SDN Controller 140 can control, direct, configure, and monitor Core Resources 174A-176B for the Core Network of the communication network 100, such as Gateways (GW) for Control Plane (CP) 174A-C, User Plane (UP) 176A-C, and/or Legacy (i.e., combined user and control plane). In another example, the Transport SDN Controller can control, direct, configure, and monitor Transport Layer services, such as a Multiprotocol Label Switching (MPLS) network, Fiber Optics network, and/or a Backbone network.

In one or more embodiments, the level 3 Manager SDN Controller 142 can manage one or more sets of level 2 SDN Controllers 135-145 in the SDN Network 150. The Manager SDN Controller 142 can configure and/or reconfigure the instantiated SDN Controllers 135-145 to optimize the SDN Network 150 according to loading created by the service requests. For example, the Manager SDN Controller 142 can automatically instantiate multiple levels of fully distributed SDN Controllers 135-145. Likewise the level 2 SDN Controllers 135-145 can instantiate and/or configure and/or reconfigure VNF elements 174A-176B at level 1. Each of the SDN Controllers 135-145 can support instantiation "on the fly" based on new requests, the ending of old requests, monitoring network traffic, and/or requesting loading information from any of the other SDN Controllers 135-145 and/or the VNF elements 174A-176B. For example, the Manager SDN Controller 142 can instantiate and/or decommission SDN Controllers 135-145 into and out from the SDN Network 150 on an on-going basis according to the exchange-to-exchange (E2E) application service requirements. Similarly, the SDN Controllers 135-145 can instantiated and/or decommission and/or reconfigure VNF elements 174A-176B. For example, in a streaming media application, such as a Netflix™ Video Delivery application, the Manager SDN Controller 142 can determine that network demands for the Access SDN Controller 135 and Transport SDN Controller 145 may be relatively large for a given set of communication devices 116, while the Core SDN Controller 140 demands for these communication devices 116 may be relatively normal. The Manager SDN Controller 142 can look at the available resources and capacities for the currently instantiated SDN Controllers 135-145 that are support these communication devices 116. If the demands of the media streaming application exceed the available resources, then the Manager SDN Controller 142 can automatically address the issue by, for example, instantiating additional Access SDN Controller 135 and Transport SDN Controller 145 resources.

In one or more embodiments, the Manager SDN Controller 142 may determine that sufficient resources exist at the currently instantiated Access SDN Controller 135 and Transport SDN Controller 145 resources, however, the priorities of these resources need to be adjusted. For example, where a heavy streaming media loading is identified, the Access SDN Controller 135 and Transport SDN Controller 145 resources may be given higher priority in comparison to the Core SDN Controller 140. Conversely, if a heavy loading of Voice over IP (VoIP) services is identified, then the Manager SDN Controller 142 can automatically place the Core Network SDN Controller 140 into higher priority in comparison to Access Network SDN Controller 135 and Transport Network SDN Controller 145.

In one or more embodiments, the SDN Controller 135-145 can decide how to use network resources to fulfill the data needs. For example, the Manager SDN Controller 142 can communicate, directly, with the SDN Controllers 135-145 on level 2 (e.g., via Open Flow) and indirectly with the Network Function Virtualization resources on the level 1. In one or more embodiments, the Manager SDN Controller 142 can access service level information associated with the communication devices 116. The Manager SDN Controller 142 can determine if the communication device 116 is associated with a premium service level, for example, and can instantiate additional resources and/or adjust priority levels of currently instantiated resources to provide requested services according to Quality of Service (QoS) levels associated with the service level.

In one or more embodiments, the SDN Controllers 135-145 can access historical information or prospective information to predict resources that may be needed at a time in the future. For example, the Manager SDN Controller 142 can access historical resource demand information associated with the network 100 and/or a particular part of the network. For example, the Manager SDN Controller 142 can determine that the demand for streaming media resources is likely to be very high on a particular day of the week, because historical data indicates that this day is a popular day of the week for streaming data. In another example, the Manager SDN Controller 142 can make this type of predictive determination for a particular communication device 116 or set of devices based on historical data. In another example, the Manager SDN Controller 142 can access a database with information on triggers that correspond to increased or decreased levels of usage (above or below mean usage). For example, the database may include information on a release of a several season of a popular program for access via streaming media. The data may further indicate a high probability for massive streaming of data associated with this program beginning at a certain time. By analyzing and responding to these indicators of out-of-typical usage, the Manager SDN Controller 142 can instantiate additional resources or, if warranted, decommission resources (or reassign to other uses).

In one or more embodiments, the SDN Controllers 135-145 can store models, templates, programs, and/or configurations associated with providing services to communication devices via the communication network 100. For example, if a communication device 116 includes High Definition camera devices, and if the user off the communication device 116 decides to upload data from the High Definition camera function to, for example, a cloud-based storage location accessible via the communication network, then the Manager SDN Controller 142 can determine the needed resources and priority settings. Based on the setup, and optionally, on analysis of the performance of the system during the upload of the data, the Manager SDN Controller 142 can determine that the entire setup should be saved for later use.

In one or more embodiments, the SDN Controllers 135-145 can receive real time feedback from network resources during operation. For example, the Manager SDN Controller 142 can receive information from the SDN Controllers 135-145 of the level 2. Alternatively, the Manager SDN Controller 142 can receive information, indirectly, from the level 1 resources and VNF devices. The Manager SDN Controller 142 can use the feedback information to determine the status of the resources that have been assigned by the Manager SDN Controller 142 to provide services. The Manager SDN Controller 142 can determine, for example, that insufficient resources have been instantiated and/or prioritized for a task or for one or more communication devices 116. The Manager SDN Controller 142 can then direct the instantiation of additional SDN Controllers 135-145 and/or alteration in configuration and/or priority of SDN Controllers 135-145. Conversely, the Manager SDN Controller 142 can determine that too many resources have been dedicated and decide to either decommission and/or reassign the resources to thereby provide on-the-fly and dynamic response.

In one or more embodiments, each of the Level 2 SDN Controllers 135-145 can instantiate required VNF elements, on-the-fly, in order to fulfill E2E service delivery. In one or more embodiments, rather than leveraging a single level SDN Controller, many SDN Controllers 142 and 135-145 can be used to achieve multiple levels of SDN control and management.

In one or more embodiments, the MGW 130 and/or the SDN Network 150 can respond to a request for a service from a communication device 116 by coordinating and/or implementing a process for the communication device 116 to access the service. In various embodiments, any of the SDN Controllers 135-145 can be responsible for the process. However, for simplicity of illustration, a non-limiting embodiment featuring a Core SDN Controller 140 is described below. In one or more embodiments, the Core SDN Controller 140 can determining if the communication device 116 is authenticated to the network 100 and/or authorized to receive the requested service. For example, the Core SDN Controller 140 can receive and process a request for service by querying an authentication server. For example, the Core SDN Controller 140 can query a Home Subscription Server (HSS) for authentication of the subscription status of the communication device 116. The Core SDN Controller 140 can further determine if the communication device 116 is authorized for accessing a requested service, such as streaming of video content, by accessing a user profile associated with the communication device 116. For example, the Core SDN Controller 140 can determine if the communication device 116 is participating in a data access plan and, if so, the terms of the data access plan. The Core SDN Controller 140 can access information at equipment of the Service Layer 135 and/or specific Mobile Applications 162A-B and/or Fixed Applications to determine if the communication device 116 is authorized for a specific service, such as specific video streaming service. In one example, the Core SDN Controller 140 can verify if a client-server relationship between the communication device 116 and an application service.

In one or more embodiments, the Core SDN Controller 140 can access user preference information for the communication device 116. In one embodiment, the Core SDN Controller 140 can fetch and look up a profile of one or more users of the communication device 116. The profile can include information on how the user and/or a subscriber to system services desires to manage data resources. For example, a network provider or system operator can sell access to services of the 5G network 110 to various types of subscribers. In one embodiment, a customer agreement can specify resources and services that are available and how the subscriber is charged for use of those resources. The customer agreement may specify certain limitations on access or usage of resources, such as, limits on reception of data from the network 100. In a typical arrangement, the subscriber may pay a monthly fee that corresponds to a monthly allotment of data. If the subscriber uses more than the allotted data, then the subscriber may incur additional fees beyond the normal monthly fee. In another typical arrangement, the communication device 116 may be linked to not only a subscriber but a group of subscribers and communication devices 116 operating under a family or enterprise customer agreement. In this scenario, the group of communication devices 116 may be operating under a set of group limitations on services, including an aggregated data limit, where every communication device 116 may share in using all of the available resources that have purchased for the group, but where all devices in the group reaches a plan limitation at the same time (e.g., a data limit).

In one or more embodiments, the Core SDN Controller 140 can retrieve information regarding prior instances of a subscriber or a subscription group (e.g., a family) responding to instances of approaching or exceeding data/resource limitations. For example, during a prior month, the subscriber may have exceeded a prearranged data limitation for the subscription service. At that time, the communication device 116 of the subscriber may have been notified by the Core SDN Controller 140 of a potential overage in data usage and may have contacted the system 100, via a portal, to request additional data resources for the monthly service period. The network 100 can track these types of instances, including those where the subscriber paid for more data, up front, in anticipation of an overage, paid for additional data at the time of notification of an impending overage, chose to disable data usage at the time the notification of an impending overage, and the like.

In one or more embodiments, the Core SDN Controller 140 can access this historical information and can apply an artificial intelligence approach to deduce subscriber preferences for handling these types of scenarios based on the past occurrences. The Core SDN Controller 140 can also request from the subscriber in-advance instructions for handling situations of overage or near overage. For example, the Core SDN Controller 140 can present to the subscriber, via a portal, a set of scenarios and request for the user to decide, in advance, how best to handle these scenarios in keeping with their preferences. For example, the subscriber may direct that the Core SDN Controller 140 can direct the system to purchase a certain amount of additional data upon the system sending a notification of impending overage if certain other criteria are met. These criteria can include, for example, proximity to the end of the monthly billing/usage cycle, the type of service that is dominant in the generation of data usage (e.g., Is it video streaming or email access?), which communication device 116 is dominant in the generation of the data usage (e.g., a parent's device or a child's device). The Core SDN Controller 140 can analyze these past situations and any forward-looking directives that have been provided by the subscriber to derive one or more experience-based directives for handling overages and near-overages. In one embodiment, the Core SDN Controller 140 can review these experienced-based directives with the subscriber for approval in advance of need and/or at the time or an overage or near-overage.

In one or more embodiments, the Core SDN Controller 140 can access directives from the profile, whether determined by the subscriber or experienced-based directives as described above. In one embodiment, the directives can specify that the subscriber be notified of an overage or a near-overage. In an overage, the account that is associated with the subscriber and the communication device 116 is already beyond a limit as spelled out in the customer agreement. In a near-overage, the account has reached a threshold, or trigger, that is below the level an out-and-out overage but is near enough to cause a concern that the overage limit will be exceeded. For example, the subscriber account may have a data limit of 20 GB, but a trigger or threshold of 90%, such that a warning notification is sent to the subscriber when the account reaches 90% of the data limit, which is 18 GB in this case. In one embodiment, the profile can direct that the system handle the overage and/or near-overage differently for different communication devices 116 associated with a group account. For example, when an account with multiple communication devices 116 reaches a near-overage, the system could be directed to alter data access for some devices while continuing normal data access for other devices. For example, the system 100 can be directed to slow down or shut down data download to a first communication device 116 that is assigned to a child in a family while maintaining data flow to a second communication device 116 that is assigned to a parent. In this way, the system 100 can impose a data reduction onto a child's device to conserve data resources in the group plan while not directly impacting data services to a parent's device.

In one embodiment, the Core SDN Controller 140 can be instructed by the profile to propose a solution to the subscriber via a message to the communication device 116. For example, the message can propose simply raising the data plan limit. In another example, the Core SDN Controller 140 can propose altering the service level that is being provided to the communication device. Dynamic control of data service can be used as a means to extend the resources for which the subscriber has paid. For example, the customer agreement may call for delivery of a certain amount of data that is nominally delivered with a certain quality of service (QoS) level. This QoS level could be in the form data rates that can support high definition (HD) video or can be sufficient to support standard definition (SD) video or can only support low quality definition sufficient for Internet browsing but not video streaming. The Core SDN Controller 140 can offer the subscriber a means for trading off speed/QoS and data. For example, a user limit of 20 GB might presume HD video capability for the entire 20 GB. However, the same customer agreement might allow for a higher data limit of 30 GB if delivered at SD video capability. Similarly, a lower QoS level might be used to further extend the data limit. In one or more embodiments, the preference profile may specify a mix of QoS levels that is presumed for the agreed upon data limit along with one or more alternative QoS level—data limit mixes that can be used by the system to bias data delivery toward different types of services/applications within the available data limit.

In one or more embodiments, when the Core SDN Controller 140 determines that the user is at the near-overage, the Core SDN Controller 140 can reformulate the data delivery QoS as directed by the profile. For example, the profile can begin a billing cycle by directing the Core SDN Controller 140 to deliver data using best available paths and data coding to achieve a QoS level for supporting HD video streaming. When the near-overage limit is hit, the profile can direct the Core SDN Controller 140 to deliver data via a slower path and/or data coding to throttle back or slow the data delivery. In one embodiment, altering of the QoS level can differ from communication device 116 to communication device 116 as specified by the profile. In one embodiment, the Core SDN Controller 140 can adjust the QoS level to throttle back or to even suspend data delivery to communication devices 116 as directed by the profile. In one embodiment, modification of the QoS level can slow down the data access by the communication device 116 to preserve the remaining data below the data limit. In one embodiment, the Core SDN Controller 140 can modify the QoS level to reduce the cost of the data that is being delivered (i.e., slower data is less expensive to deliver) while providing a no cost or low cost means for extending the available data limit.

In one or more embodiments, the Core SDN Controller 140 can include resource requirements for providing the service to the communication device 116 in the determination of how to handle the usage of those resources. The Core SDN Controller 140 may determine that the service that has been requested is not particularly data intensive. In such case, the fact that the subscriber is at a near-overage level may not be as critical as it would be if the subscriber was accessing a very intensive service. In one embodiment, the Core SDN Controller 140 can be directed by the preference profile and/or can apply an additional adjust to the handling of over and/or near-overage based on the anticipated requirements/loading for the requested service. In one embodiment, the Core SDN Controller 140 can rank the data requirements for the requested service according to a scale of data intensiveness. The profile can, in turn, include alternative directives for different levels of data intensiveness.

In one or more embodiments, the Core SDN Controller 140 can communicate with the communication device 116, or any other device associated with the subscriber account, regarding the current data/resource usage. In one embodiment, the Core SDN Controller 140 can send a notification to the subscriber with information regarding a near-overage or an actual-overage. The notification can include one or more proposed actions for dealing with the issue. For example, the notification can offer to extend the data limit for the subscriber account via an addition fee. In another example, the notification can offer to extend the data limit while reducing the QoS level for delivery of additional data. In another example, the notification can offer to slow down data delivery such that the subscriber account is less likely to exceed the data limit. In another example, the notification can offer to increase the QoS level or to other increase the network resources that are available to the communication device 116 for delivery of the service and to include an additional fee for this upgrade. In one embodiment, the notification can combine these options to provide the subscriber with a rich set of alternatives for dealing with the data delivery scenario. These options can be applied, across the board, to all of the devices in a group of devices associated with the subscriber or can be applied on a per device basis, with the optional changes (and billings) applied to the devices on a per device basis.

In one or more embodiments, the Core SDN Controller 140 can determine its actual course of action based on a response from the subscriber. In one embodiment, the Core SDN Controller 140 can maintain the current service level and trajectory if no response is received from the subscriber. In one embodiment, the profile can include a default action for the Core SDN Controller 140 in a case, where no response is received from the subscriber. For example, the Core SDN Controller 140 can automatically throttle back or suspend data service to a communication device 116 associated with the subscriber when the subscriber account reaches an overage or a near-overage.

In one or more embodiments, the Core SDN Controller 140 can implement any modification to the network 100, as needed, according to the directive that is determined from the profile and/or by a combined action between the profile and the Core SDN Controller 140. When an overage or a near-overage is detected, the Core SDN Controller 140 may be directed to throttle back data delivery to a communication device 116. For example, during the delivery of streaming video to a communication device 116 may the SDN Network 150 may have routed the data to the communication device 116 via a User Path Gateway 176A in the Core Network. This User Path Gateway 176A may, in fact, be implemented as a Virtual Network Function (VNF) that is instantiated by the Core SDN Controller 140. In the process of throttling back data delivery to the communication device 116, the Core SDN Controller 140 may cause a change in performance in of this VNF element, User Path Gateway 176A. In one case, the Core SDN Controller 140 can reduce a priority at the VNF element, User Path Gateway 176A, such as a priority of communications assigned to the communication device 116 and/or communications assigned to the streaming service. This change in priority can cause the data flow to the communication device 116 to be throttled back. In another case, the VNF element, User Path Gateway 176A can be made up of many individual VNF elements. The Core SDN Controller 140 can decommission one or more VNF elements of the User Path Gateway 176A. Again, this approach can throttle back or even shut off the data flow to the communication device 116. In addition, by reducing the priority of VNF elements or decommissioning these VNF elements away from being dedicated to serving the communication device 116, the Core SDN Controller 140 can free up these SDN-based resources for other uses. In one embodiment, the Core SDN Controller 140 can instantiate additional VNF elements to increase speed of service.

In one or more embodiments, the Core SDN Controller 140 can determine a change in billing or charging for service. For example, if the subscriber decides to increase the data limit in response to an overage or a near-overage, then an additional fee may be generated. Similarly, if the directive results in adding new capacity to the data path, then this may generate an additional fee. If the directive results in a reduced service level, such as a reduce QoS level, then this may result in a reduced fee or a comparatively reduced charge for an overage. The Core SDN Controller 140 communicate this charging decision to the SDN Network 150 and to elements within the communication network 100 that are responsible for generating billing.

In one or more embodiments, the SDN Network 150 can adapt the performance of the 5G network 110 to maintain customer satisfaction. A Core SDN Controller 140 can, as needed instantiate new resources, decommission existing resources, and/or change priorities of resources. These actions are based, ultimately, upon user decisions regarding handling of overages or potential overages. These system responses can be pre-programmed, generated from historical analysis of prior data limit scenarios, and/or based on direct user input.

In one or more embodiments, the Core SDN Controller 140 receive an indication that the communication network 100 is experiencing some kind of an issue that can result in reduced ability to deliver the service to the communication device 116. In one embodiment, the Core SDN Controller 140 can use the SDN capability to respond to outages/failures/bottlenecks in the network. For example, the Core SDN Controller 140 can receive information from the network (OpenFlow) and determine that there is a problem with congestion and/or an outage that will result in a communication device 116 receiving service that is below a QoS level. In this case, the Core SDN Controller 140 can refer to a Policy Server to determine how to respond. The Core SDN Controller 140 can reallocate resources to or from the communication device 116 depending on circumstances. For example, if a public safety usage is more important that the service requested by the communication device 116, then the public safety use can be given priority over the service requested by the communication device 116.

In one or more embodiments, the Core SDN Controller 140 can receive an indication of a level of degradation of service that is being experienced by the communication device 116. For example, the Core SDN Controller 140 can rank degradations of QoS level according to a scale. The Core SDN Controller 140 can then flexibly adjust pricing for the service that is delivered, under the degraded conditions, based on the ranked level of degradation.

In one or more embodiments, the Core SDN Controller 140 can identify a one or more sources for congestion or outage in the 5G network 110. In one embodiment, the Core SDN Controller 140 make a modification or adjustment in the performance of the network. In one embodiment, the Core SDN Controller 140 can rank the congestion or outage and can then determine how to modify the network 100 based on the severity of the ranking. For example, the Core SDN Controller 140 can instantiate additional resources, such as additional VNF elements 174A-176B, to provide additional resources to ameliorate the congestion or outage. In one embodiment, the Core SDN Controller 140 can determine a billing for the additional resources that are added, if necessary.

In one or more embodiments, the SDN Network 150 can provide network slicing with distributed VNF elements 174A-176B to support diverged types of services and requirements in a 5G network 100. The network slicing can effectively distribute functionality for facilitating services to communication devices 116 across the network. Traditional cellular architectures use purpose-built boxes to provide mobility network functions. For example, in a Long Term Evolution (LTE) architecture, S-GW, P-GW, and eNB functions are physically placed into the network as fixed assets for providing control plane, user plane, and access node capabilities. This approach to the architecture is very expensive and is found to not scale economically. In one embodiment, a Fifth Generation (5G) Network may need to support diverged types of services with significantly different requirements. For example, Vehicle-to-Vehicle (V2V) communications applications require ultra-reliable and low latency communications, as exemplified by the requirements of a connected car performing real-time navigation. In another example, an Internet of Things (IoT) device, such as a meter reader, my only require relatively low bandwidth and perform acceptably under relaxed latency requirements. In another example, an enterprises-based service may require a subscriber profile information that is co-located with an application. For example, an enterprise, such as a business, may have a dedicated Home Subscriber Server (HSS) functionality that is located within a network that is managed by the enterprise. In this case, an enterprise cloud could, in fact, be a private cloud that is managed separately by the enterprise and apart from the communication network that is managed by an operator provider. In this case, one or more VNF elements 162A, 174A, 176A can be instantiated in the enterprise's network.

The range of services, network and application requirements, and communication loading represented by divergent devices, such as meter readers, vehicle control, and smart phone devices, can create overall system requirements that are not economically feasible via traditional mobility network architectures.

In one or more embodiments, a SDN-controlled network, using cloud-based concepts, can provide flexible network slicing with distributed functionality to support these diverged types of services and requirements in a 5G network. SDN controllers 142 can provide control and configuration to support different network slices on appropriate network clouds 162A-B by instantiating and controlling a proper sets of VNF elements 174A-176B and by the optimal distribution of these VNF elements 174A-176B based on application and service requirements.

In one or more embodiments, network slicing can be used by the SDN network to support multiple virtual networks behind the air interface(s) 117 of the communication network. The slicing of the network into multiple virtual networks can provide optimal support for different Radio Access Networks (RAN) and/or different service types running across a single RAN. Further, in one or more embodiments, flexible distribution of the access, edge, and core elements of the network cloud can provide optimal support regarding latency and/or service isolation for different apps and service requirements.

In one or more embodiments, the SDN Network 150 can determine what service(s) is being used and which Access Point Node (APN) is being used for the specific traffic. In one embodiment, the analysis can be performed by a SDN controller 135-145, which derive information either directly from communications entering the network 100 form one or more communication devices 116 or from a MGW 130 that is monitoring this type of traffic. In one or more embodiments, a SDN Controller 142 can perform analysis that determine a detailed granularity of the specific services being sought by or provided to the communication device 116. This detailed granularity can reveal sets of service functions (e.g., identifying servers, providing connections to applications, verifying authenticity, and/or providing control plane and user plane functions) that are necessary for facilitating the delivery of services. The detailed granularity can also include determining various data pathways, within the network 100 and beyond, necessary for facilitating the delivery of services. The SDN Controller 142 can instantiate VNF elements 174A, 176A that can cause traffic to be sent to respective destinations such as 4G, 4G+, or 5G APNs, based upon breaking up the specific services requested into the types of service functions, resources, data accesses, and/or network data paths. The VNF elements that are composed, configured, and chained by the SDN Controller 142 for implementing the necessary service functions are, in turn, instantiated into the 5G network 100 in network locations that take optimize one or more characteristics of the service functions and/or network data paths.

In one or more embodiments, the SDN Network 150, such as the Manager SDN Controller 142 and/or the Core SDN Controller 140, can dynamically identifying a proper set of service functions needed for each service that is provided to the communication devices 116. In one embodiment, the SDN Controller 140 can generate or compose functions and chaining these functions together for providing the services as functional slices of the overall communication network 100. The functions can be used by the SDN Controller 140 to generate VNF elements 174A. These VNF elements 174A can then be distributed by the SDN Controller 140 to various parts of the communication network 100. The SDN Controller 140 can facilitate distribution of VNF elements 174A to proper clouds based on the service requirements. In one or more embodiments, these slices of the network can be distributed based on reducing latency, minimizing network data paths, ease of access to local applications 162A-162B, data, and/or servers, and so forth. In one or more embodiments, multiple, distributed network slices, such as a first slice 162A, 174A, 176A, and a second slice 162B, 174B, 176B, can be determined, composed, instantiated, supported, modified, and/or decommissioned by a SDN Controller 140.

In one or more embodiments, the SDN Network 150 can interact with one or more MGW 130 to identify services that are requested by communication devices 116. In addition, the SDN Network 150 can use the MGW 130 to determine whether a given communication device 116 is targeted to 4G or 5G functions, such as separated or combined control/user planes. The SDN Controller 140 can determined whether a 4G or 5G core should be used for the core network slice.

In one or more embodiments, the SDN Controller 140 can monitor and/or collect information on network resources during runtime. The network resource information can include utilization or resources, such as from RAN, transport, and core resources. The SDN Controller 140 can use this information to determine if the network resource is adequate for providing the service, is not sufficient, or is excessive (wasteful). The SDN Controller 140 can then dynamically adjusting the resource allocation for each VNF within each slice. The SDN Controller 140 can modify performance factors, such as configurations and/or priorities. The SDN Controller 140 can instantiate additional VNF elements and/or decommission existing elements.

In one or more embodiments, the network slicing can provide distributed functionality to support divergent types of services and requirements. By leveraging SDN capabilities, the network 100 can control different types of network slices at different locations by providing proper sets of VNF elements to proper network locations. This approach can improve the mobility network, today, and provide pathways to improving scalability, efficiency and end user experience into the future. The slice of the network can personalized to each enterprise or customer. The modern communication network is very centralized with core, service, and access layers located at central serving offices and hubs. In these architectures, all of the information—services, data, programs, etc.,—moves through access to core to service layers. However, with a decentralized network, the service pathways to the communication devices are distributed to the "edges" of the network 100—or even into a customer's building. This decentralization removes much (ultimately) unnecessary network loading while compartmentalizing global risks of local network issues.

In one or more embodiments, the SDN Network 150 can enable tailoring of services and/or tailoring of access by third parties at the enterprise. In one or more embodiments, the SDN Network can enable a centralized control plane for initiating and supporting communication sessions, authentication, movement between locations (i.e., handoff), and/or selection of source of data. The SDN Network can, at the same time, enable a decentralized user plane for accessing and delivering user data. For example, user plane functions can be moved to the enterprise (or nearby). The slicing of the network can be performed by the SDN Network on an On-Demand basis. For example, sliced resources can be allocated to one or more communication devices 116 while those devices 116 are actively accessing data from the network. However, if the devices 116 stop using these resources at a later time (or reduce activity), then the SDN Network can reallocate these sliced resources back to network. The SDN Network can determine where in the physical network it should configure the VNF functions—such as the control plane or the user plane—based on communication needs, configuration, service plans, etc. The SDN Network can slice up network resources such that, in one scenario, the Control Plane and the User Plane can be centralized at the cloud, while, in another scenario, the User Plane can be at dynamically moved to an enterprise.

Figure 3:
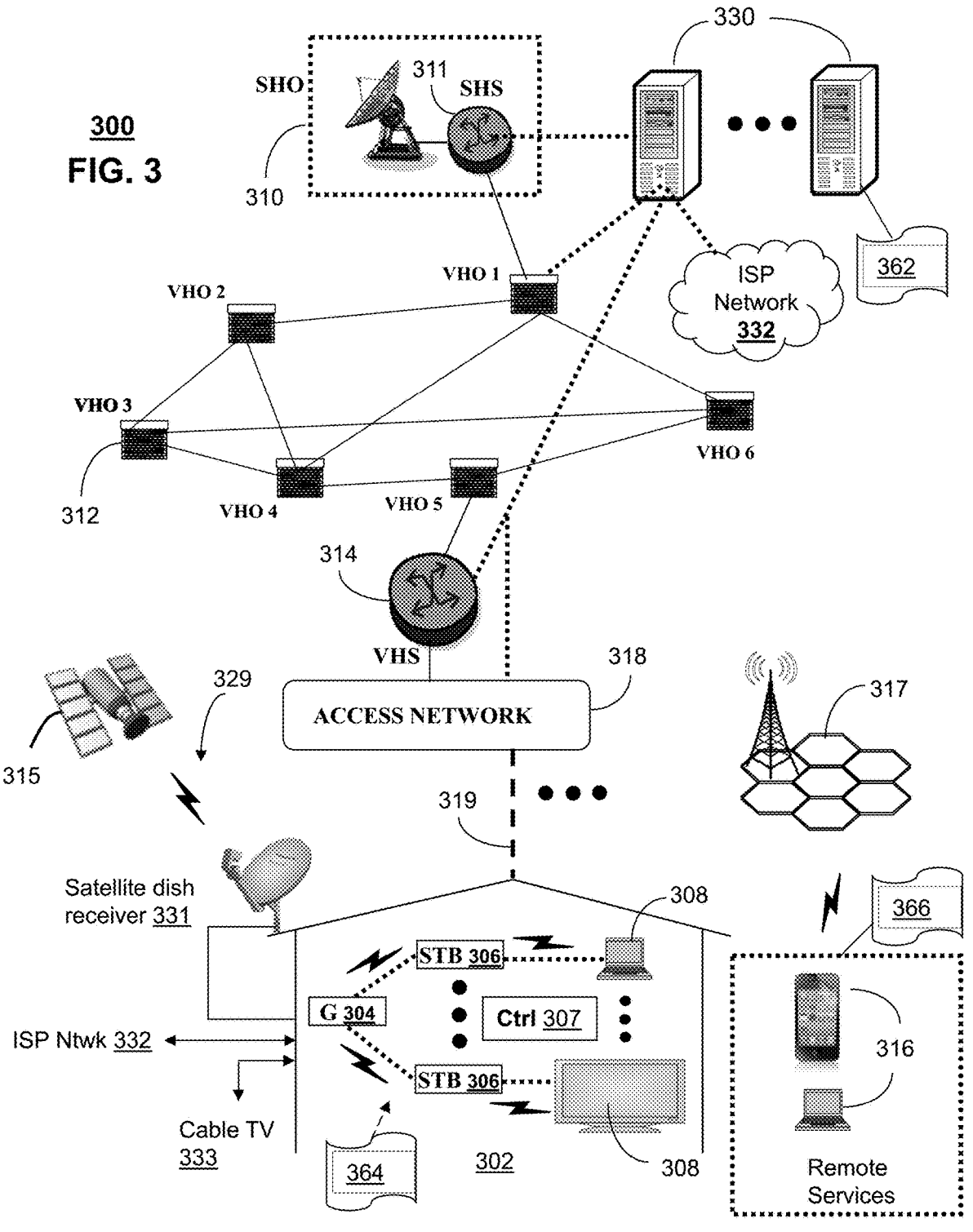
FIGS. 3-4 depict illustrative embodiments of communication systems that provide media services that can be used by the communication network of FIG. 1.

FIG. 3 depicts an illustrative embodiment of a communication system 300 for providing various communication services, such as delivering media content. The communication system 300 can represent an interactive media network, such as an interactive television system (e.g., an Internet Protocol Television (IPTV) media system). Communication system 300 can be overlaid or operably coupled with system 100 of FIG. 1 as another representative embodiment of 5G network 110. For instance, one or more devices illustrated in the communication system 300 of FIG. 3 for a 5G Network that leverages 4G RAN and 5G RAN access points for providing services to communication devices.

In one or more embodiments, the communication system 300 can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS)

314 via a network of video head-end offices (VHO) 312 according to a multicast communication protocol. The VHS 314 can distribute multimedia broadcast content via an access network 318 to commercial and/or residential buildings 302 housing a gateway 304 (such as a residential or commercial gateway).

The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 302. Modulated signals received by the satellite dish receiver 331 can be transferred to the media processors 306 for demodulating, decoding, encoding, and/ or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. System 300 enables various types of interactive television and/or services including IPTV, cable and/or satellite. The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media devices 308 or wireless communication devices 316.

Communication system 300 can also provide for all or a portion of the computing devices 330 to function as a Management Gateway (MGW) 330. The MGW 330 can use computing and communication technology to perform function 362, which can include among other things, the communication network adaptation techniques described by method 200 of FIG. 2. For instance, function 362 of MGW 330 can be similar to the functions described for MGW 130 of FIG. 1 in accordance with method 200. The media processors 306 and wireless communication devices 316 can be provisioned with software functions 364 and 366, respectively, to utilize the services of MGW 330. For instance, functions 364 and 366 of media processors 306 and wireless communication devices 316 can be similar to the functions described for the communication devices 116 of FIG. 1 in accordance with method 200.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 4:
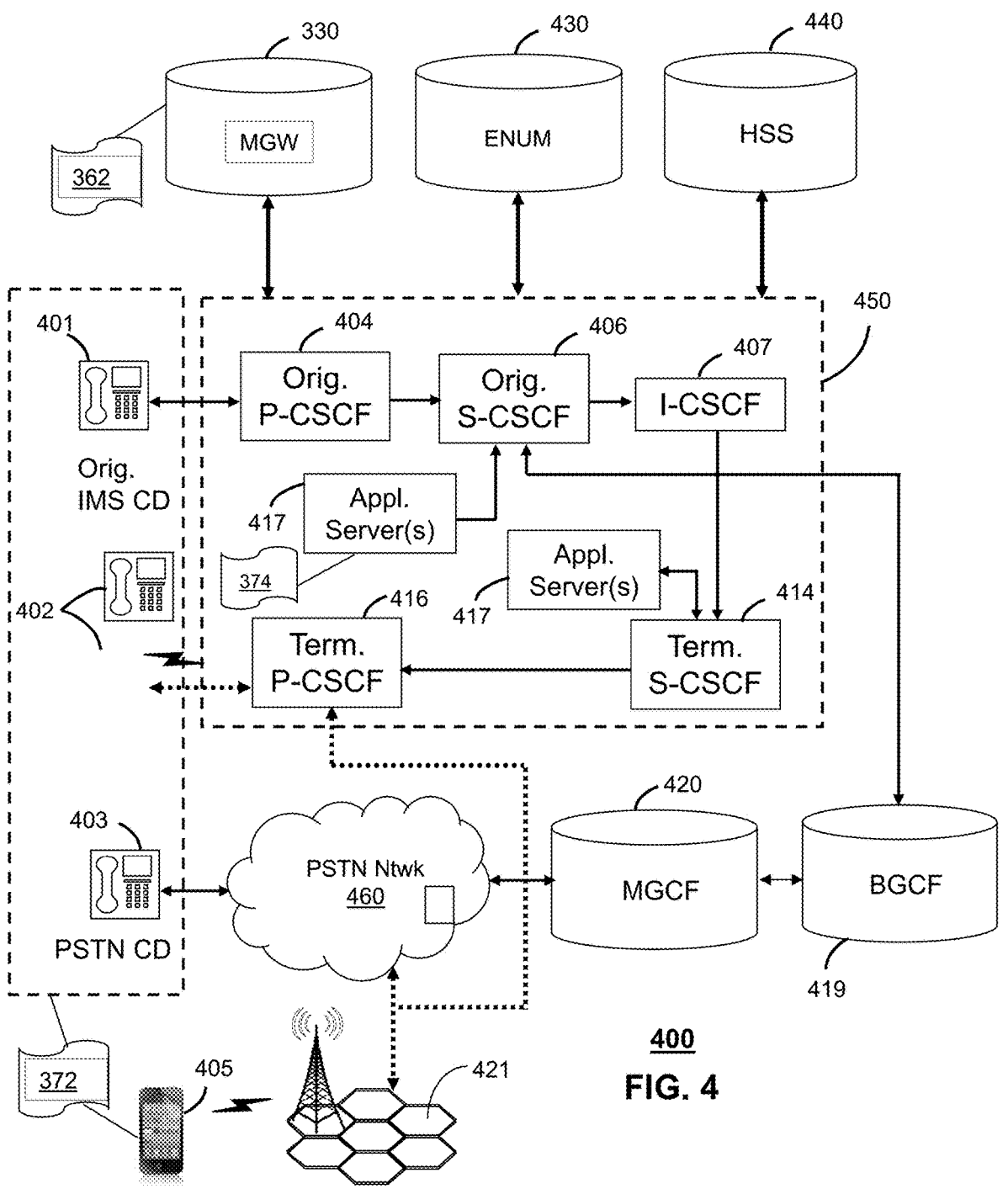

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 of FIG. 1 and communication system 300 as another representative embodiment of communication system 300. The subject disclosure describes, among other things, illustrative embodiments for a 5G Network that leverages 4G RAN and 5G RAN access points for providing services to communication devices.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 300 of FIG. 3.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The MGW 330 of FIG. 3 can be operably coupled to communication system 300 for purposes similar to those described above. MGW 330 can perform function 362 and thereby provide adaptation of the communication system 100 for providing services to the CDs 401, 402, 403 and 405 of FIG. 4 similar to the functions described for Manager SDN Controller 142 of FIG. 1 in accordance with method 200 of FIG. 2. CDs 401, 402, 403 and 405, which can be adapted with software to perform function 472 to utilize the services of the MGW 330 similar to the functions described for communication devices 116 of FIG. 1 in accordance with method 200 of FIG. 2. MGW 330 can be an integral part of the application server(s) 417 performing function 474, which can be substantially similar to function 364 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 5:
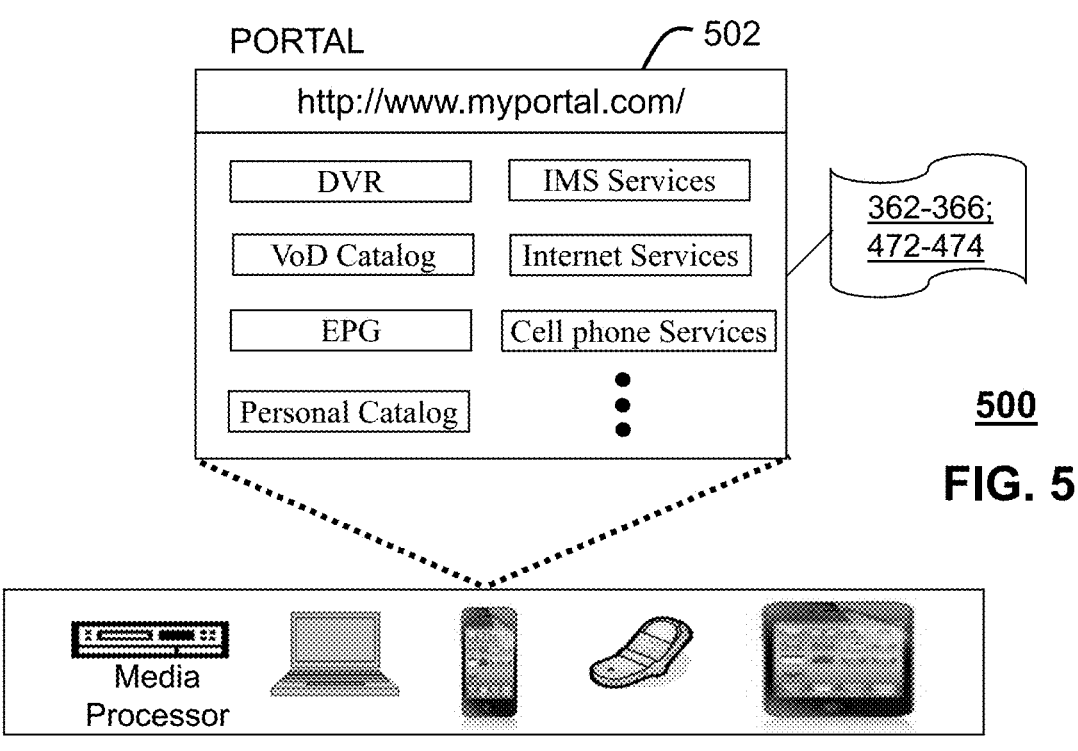
FIG. 5 depicts an illustrative embodiment of a web portal for interacting with the communication systems of FIGS. 1 and 3-4.

FIG. 5 depicts an illustrative embodiment of a web portal 502 of a communication system 500. Communication system 500 can be overlaid or operably coupled with system 100 of FIG. 1, communication system 300, and/or communication system 400 as another representative embodiment of system 100 of FIG. 1, communication system 300, and/or communication system 400. The web portal 502 can be used for managing services of system 100 of FIG. 1 and communication systems 300-400. A web page of the web portal 502 can be accessed by a Uniform Resource Locator (URL) with an Internet browser using an Internet-capable communication device such as those described in FIG. 1 and FIGS. 3-4. The web portal 502 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 306. The web portal 502 can also be used for provisioning IMS services described earlier, provisioning Internet services, provisioning cellular phone services, and so on.

The web portal 502 can further be utilized to manage and provision software applications 362-366, and 472-474 to adapt these applications as may be desired by subscribers and/or service providers of system 100 of FIG. 1, and communication systems 300-400. For instance, users of the services provided by MGW 130 or 330 can log into their on-line accounts and provision the MGW 130 or 330 with describe a feature that a user may want to program such as user profiles, provide contact information to server to enable it to communication with devices described in FIGS. 1 and 3-4 and so on. Service providers can log onto an administrator account to provision, monitor and/or maintain the system 100 of FIG. 1 or MGW 330.

Figure 6:
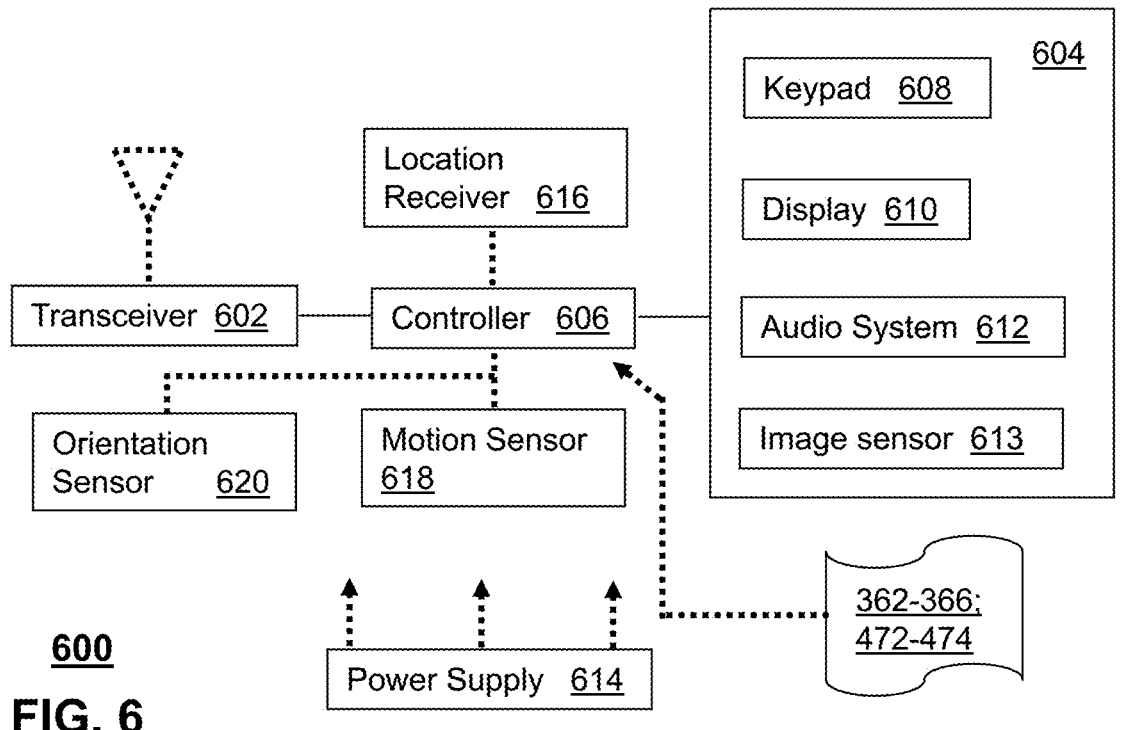
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1 and FIGS. 3-4 and can be configured to perform portions of method 200 of FIG. 2.

Communication device 600 can comprise a wireline and/ or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/ GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIG. 1, the media processor 306, the media devices 308, or the portable communication devices 316 of FIG. 3, as well as the IMS CDs 401-402 and PSTN CDs 403-405 of FIG. 4. It will be appreciated that the communication device 600 can also represent other devices that can operate in systems of FIG. 1, communication systems 300-400 of FIGS. 3-4 such as a gaming console and a media player. In addition, the controller 606 can be adapted in various embodiments to perform the functions 362-366 and 472-474, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
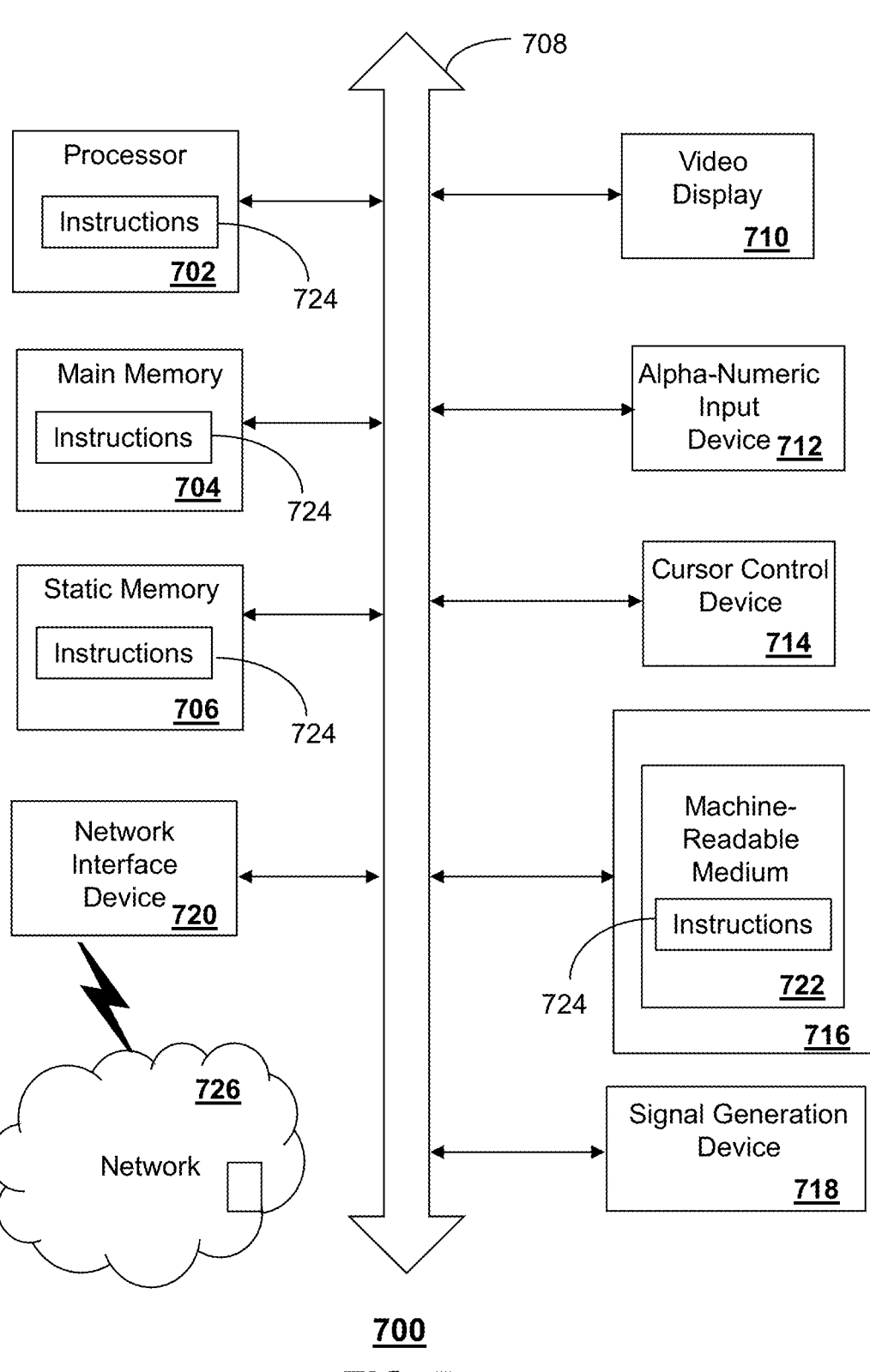
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the Manager SDN Controller 130, the SDN Controllers 135-145, and the communication device 116 in FIG. 1. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and/or HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising executable instructions that, when executed by a processing system including a processor, facilitate performance of operations, the operations comprising:

determining whether to facilitate, in a geographic area, a first communication between a first wireless communication device and a communication network via a second wireless access network, wherein the determining is based on detecting a service request from a second wireless communication device, wherein the determining comprises obtaining and comparing, responsive to the detecting the service request, first priorities corresponding to a first set of voice and data services associated with the first wireless communication device and second priorities corresponding to a second set of voice and data services associated with the second wireless communication device, wherein the determining further comprises identifying whether a user setting for an inter-domain function is turned on or off, and wherein the inter-domain function being turned on enables a determined ongoing low priority communication session between the first wireless communication device and the communication network that is being facilitated via a first wireless access network to be automatically switched over for facilitation via the second wireless access network when a determined high priority communication session for another wireless communication device is requested;

based on identifying that the user setting for the inter-domain function is turned on, that the first communication is not associated with an ongoing data service, and that a priority associated with the service request is a determined low priority, enabling a first wireless access device of the first wireless access network to facilitate the first communication between the first wireless communication device and the communication network, and causing a second wireless access device of the second wireless access network to facilitate communications between the second wireless communication device and the communication network;

based on subsequently identifying that the user setting for the inter-domain function is turned on and that a first priority associated with the first communication is lower than a second priority associated with another service request of the second wireless communication device, determining to facilitate the first communication between the first wireless communication device and the communication network via the second wireless access network regardless of the first wireless access network being capable of facilitating the first communication, and directing the second wireless access device of the second wireless access network to facilitate the first communication in the geographic area between the first wireless communication device and the communication network, wherein the second wireless access network and the first wireless access network each provides wireless coverage of the geographic area;

based on the subsequently identifying, directing the first wireless access device of the first wireless access network to stop facilitating communications in the geographic area between the first wireless communication device and the communication network, wherein the first wireless access device facilitates communications between the first wireless communication device and the communication network according to a default policy; and causing communications between the first wireless communication device and the communication network to be locked to wireless access devices of the second wireless access network based on determined mobility associated with the first wireless communication device so as to reduce service drops for the first wireless communication device.

2. The non-transitory computer-readable storage medium of claim 1, wherein the first wireless access network and the second wireless access network employ different radio access technologies (RATs).

3. The non-transitory computer-readable storage medium of claim 2, wherein the different RATs comprise 5G and 4G, respectively.

4. The non-transitory computer-readable storage medium of claim 1, wherein the operations further comprise accessing a first network capability associated with the first wireless access network, and wherein the determining whether to facilitate the first communication in the geographic area between the first wireless communication device and the communication network via the second wireless access network is further according to the first network capability.

5. The non-transitory computer-readable storage medium of claim 1, wherein the operations further comprise accessing user profile data associated with the first wireless communication device, and wherein the determining whether to facilitate the first communication in the geographic area between the first wireless communication device and the communication network via the second wireless access network is further according to the user profile data.

6. The non-transitory computer-readable storage medium of claim 1, wherein the operations further comprise accessing a first wireless communication load carried by the first wireless access network, and wherein the determining whether to facilitate the first communication in the geographic area between the first wireless communication device and the communication network via the second wireless access network is further according to the first wireless communication load.

7. The non-transitory computer-readable storage medium of claim 1, wherein the operations further comprise accessing a second network capability associated with the second wireless access network, and wherein the determining whether to facilitate the first communication in the geographic area between the first wireless communication device and the communication network via the second wireless access network is further according to the second network capability.

8. The non-transitory computer-readable storage medium of claim 1, wherein the operations further comprise accessing a second wireless communication load carried by the second wireless access network, and wherein the determining whether to facilitate in the geographic area the first communication between the first wireless communication device and the communication network via the second wireless access network is further according to the second wireless communication load.

9. The non-transitory computer-readable storage medium of claim 1, wherein the operations further comprise comparing a first device capability associated with the first wireless communication device with a second device capability associated with the second wireless communication device, and wherein the determining whether to facilitate in the geographic area the first communication between the first wireless communication device and the communication network via the second wireless access network is further according to the comparing of the first device capability of the first wireless communication device and the second device capability of the second wireless communication device.

10. The non-transitory computer-readable storage medium of claim 1, wherein the operations further comprise comparing a first service urgency of the first wireless communication device and a second service urgency of the second wireless communication device, and wherein the determining whether to facilitate in the geographic area the first communication between the first wireless communication device and the communication network via the second wireless access network is further according to the comparing of the first service urgency and the second service urgency.

11. The non-transitory computer-readable storage medium of claim 1, wherein the determining whether to facilitate in the geographic area the first communication between the first wireless communication device and the communication network via the second wireless access network is further according to a requirement of a service selected by the first wireless communication device.

12. The non-transitory computer-readable storage medium of claim 1, wherein the operations further comprise directing the first wireless communication device to fall back to the first wireless access network based on a third determination of a performance degradation of the first communication between the first wireless communication device and the communication network, and wherein the performance degradation is due to an out-of-coverage condition at the first wireless communication device.

13. The non-transitory computer-readable storage medium of claim 1, wherein the operations further comprise directing the first wireless communication device to fall back to the first wireless access network based on a third determination of a performance degradation of the first communication between the first wireless communication device and the communication network, and wherein the performance degradation is due to a network overload condition at the second wireless access network.

14. A network wireless access device, comprising:

a processing system including a processor; and a memory that stores executable instructions that, when executed by the processing system, facilitate performance of operations, the operations comprising:

receiving, from a management gateway device associated with a communication network, a command to provide first communication in a geographic area between a first wireless communication device and the communication network, wherein the management gateway device determines whether to facilitate the first communication in the geographic area based on detecting a service request from a second wireless communication device, wherein the management gateway device determines whether to facilitate the first communication in the geographic area by obtaining and comparing, responsive to the detecting the service request, first priorities corresponding to a first set of voice and data services associated with the first wireless communication device and second priorities corresponding to a second set of voice and data services associated with the second wireless communication device, wherein the management gateway device further determines whether to facilitate the first communication in the geographic area by identifying whether a user setting for an inter-domain function is turned on or off, wherein the inter-domain function being turned on enables a determined ongoing low priority communication session between the first wireless communication device and the communication network that is being facilitated via a first wireless access network to be automatically switched over for facilitation via a second wireless access network when a determined high priority communication session for another wireless communication device is requested, wherein the command is based on the management gateway device identifying that the user setting for the inter-domain function is turned on and that a first priority associated with the first communication is lower than a second priority associated with the service request of the second wireless communication device, wherein a first wireless access device is associated with the first wireless access network, wherein the network wireless access device is associated with the second wireless access network, wherein the command is received regardless of the first wireless access network being capable of facilitating the first communication, and wherein the command is received subsequent to an earlier identification by the management gateway device that the user setting for the inter-domain function is turned on, that the first communication is not associated with an ongoing data service, and that a priority associated with an earlier service request from the second wireless communication device is a determined low priority, in which the first wireless access device of the first wireless access network is caused to facilitate the first communication between the first wireless communication device and the communication network and in which the network wireless access device of the second wireless access network is caused to facilitate communications between the second wireless communication device and the communication network; and responsive to the receiving of the command, facilitating the first communication in the geographic area between the first wireless communication device and the communication network via the network wireless access device, wherein the first wireless access network and the second wireless access network each provides wireless coverage of the geographic area, wherein the first wireless access device associated with the first wireless access network is further directed by the management gateway device to stop facilitating communications in the geographic area between the first wireless communication device and the communication network, and wherein communications between the first wireless communication device and the communication network are locked to wireless access devices of the second wireless access network based on determined mobility associated with the first wireless communication device so as to reduce service drops for the first wireless communication device.

15. The network wireless access device of claim 14, wherein the first wireless access device facilitates communications between the first wireless communication device and the communication network according to a default policy.

16. The network wireless access device of claim 14, wherein the first wireless access network and the second wireless access network employ different radio access technologies (RATs).

17. The network wireless access device of claim 14, wherein the management gateway device directs the first wireless communication device to fall back to the first wireless access network according to a performance degradation of the first communication between the first wireless communication device and the communication network.

18. The network wireless access device of claim 17, wherein the performance degradation is due to an out-of-coverage condition at the first wireless communication device, a network overload condition at the second wireless access network, or any combination thereof.

19. A method, comprising:

directing, by a processing system including a processor, a second wireless access device of a second wireless access network to facilitate first communication in a geographic area between a first wireless communication device and a communication network, wherein the second wireless access network and a first wireless access network each provides wireless coverage of the geographic area, wherein the directing the second wireless access device to facilitate the first communication is based on obtaining and comparing, by the processing system and responsive to a service request from a second wireless communication device, first priorities corresponding to a first set of voice and data services associated with the first wireless communication device and second priorities corresponding to a second set of voice and data services associated with the second wireless communication device, wherein the directing is further based on identifying, by the processing system, that a user setting for an inter-domain function is turned on, wherein the inter-domain function being turned on enables a determined ongoing low priority communication session between the first wireless communication device and the communication network that is being facilitated via the first wireless access network to be automatically switched over for facilitation via the second wireless access network when a determined high priority communication session for another wireless communication device is requested, wherein the directing is further based on detecting, by the processing system, that a first priority associated with the first communication is lower than a second priority associated with the service request of the second wireless communication device, wherein the directing is regardless of the first wireless access network being capable of facilitating the first communication, and wherein the directing is performed subsequent to an earlier identification by the processing system that the user setting for the inter-domain function is turned on, that the first communication is not associated with an ongoing data service, and that a priority associated with an earlier service request from the second wireless communication device is a determined low priority, in which a first wireless access device of the first wireless access network is caused to facilitate the first communication between the first wireless communication device and the communication network and in which the second wireless access device of the second wireless access network is caused to facilitate communications between the second wireless communication device and the communication network;

directing, by the processing system, the first wireless access device of the first wireless access network to stop facilitating communications in the geographic area between the first wireless communication device and the communication network, wherein the directing the first wireless access device to stop facilitating the communications is based on the obtaining, the comparing, the identifying, and the detecting; and causing, by the processing system, communications between the first wireless communication device and the communication network to be locked to wireless access devices of the second wireless access network based on determined mobility associated with the first wireless communication device so as to reduce service drops for the first wireless communication device.

20. The method of claim 19, wherein the first wireless access network and the second wireless access network employ different radio access technologies (RATs).

* * * * *